(12) United States Patent
Junk et al.

(10) Patent No.: US 10,855,367 B2
(45) Date of Patent: Dec. 1, 2020

(54) METHODS AND APPARATUS TO BRIDGE COMMUNICATIONS BETWEEN DEVICES USING LOW-ENERGY DEVICES

(71) Applicant: Fisher Controls International LLC, Marshalltown, IA (US)

(72) Inventors: Kenneth William Junk, Marshalltown, IA (US); Kurtis K. Jensen, Marshalltown, IA (US); Annette Lynn Latwesen, Marshalltown, IA (US)

(73) Assignee: FISHER CONTROLS INTERNATIONAL LLC, Marshalltown, IA (US)

( * ) Notice: Subject to any disclaimer, the term of this patent is extended or adjusted under 35 U.S.C. 154(b) by 0 days.

(21) Appl. No.: 16/144,748

(22) Filed: Sep. 27, 2018

(65) Prior Publication Data
US 2019/0103914 A1    Apr. 4, 2019

Related U.S. Application Data

(60) Provisional application No. 62/567,051, filed on Oct. 2, 2017.

(51) Int. Cl.
*H04B 7/26* (2006.01)
*H04L 12/46* (2006.01)
(Continued)

(52) U.S. Cl.
CPC ........... *H04B 7/26* (2013.01); *G05B 19/4186* (2013.01); *H04L 12/4625* (2013.01); *H04L 12/66* (2013.01); *H04L 67/12* (2013.01); *H04L 69/08* (2013.01); *H04W 4/18* (2013.01); *H04W 4/80* (2018.02); *H04W 12/10* (2013.01);
(Continued)

(58) Field of Classification Search
CPC .......... H04B 7/26; H04W 4/80; H04W 12/10; G05B 19/4186; H04L 12/4625; H04L 67/12
See application file for complete search history.

(56) References Cited

U.S. PATENT DOCUMENTS 6,434,157 B1 * 8/2002 Dube' .................. H04L 12/462
370/401
2005/0240675 A1 * 10/2005 Caspers ................. H04L 12/66
709/230
(Continued)

FOREIGN PATENT DOCUMENTS

DE     102014106727    11/2015
EP     3255906         12/2017

OTHER PUBLICATIONS

Bluetooth Specification Version 4.2.*
International Searching Authority "International Search Report," issued in connection with International Patent Application No. PCT/US2018/053497, dated Jan. 10, 2019 (6 pages).
International Searching Authority "Written Opinion," issued in connection with International Patent Application No. PCT/US2018/053497, Jan. 10, 2019 (8 pages).

*Primary Examiner* — Zhitong Chen
(74) *Attorney, Agent, or Firm* — Hanley, Flight & Zimmerman, LLC

(57) ABSTRACT

Methods, apparatus, and articles of manufacture are disclosed. An example apparatus includes a field device including a network bridge, the network bridge to convert first data received at a first Bluetooth Low Energy (BLE) radio of the network bridge, over a BLE network, from a second BLE radio of a remote device, and formatted according to a BLE communication protocol, into second data formatted according to an industrial communication protocol.

20 Claims, 23 Drawing Sheets

(51) Int. Cl.
*H04W 12/10* (2009.01)
*G05B 19/418* (2006.01)
*H04W 4/80* (2018.01)
*H04L 29/08* (2006.01)
*H04L 29/06* (2006.01)
*H04W 4/18* (2009.01)
*H04L 12/66* (2006.01)
*G05B 19/042* (2006.01)

(52) U.S. Cl.
CPC .............. *G05B 19/0423* (2013.01); *G05B 2219/13164* (2013.01); *G05B 2219/23406* (2013.01); *G05B 2219/25186* (2013.01); *G05B 2219/25232* (2013.01); *G05B 2219/25428* (2013.01)

(56) References Cited

U.S. PATENT DOCUMENTS

| | | |
|---|---|---|
| 2010/0190442 A1 | 7/2010 | Citrano, III et al. |
| 2013/0086149 A1* | 4/2013 | Shi .......................... G06F 9/546 709/203 |
| 2017/0099527 A1* | 4/2017 | Propst, Jr. .............. G08C 23/04 |
| 2017/0359675 A1* | 12/2017 | Gopalakrishnan ...... H04W 4/80 |

* cited by examiner

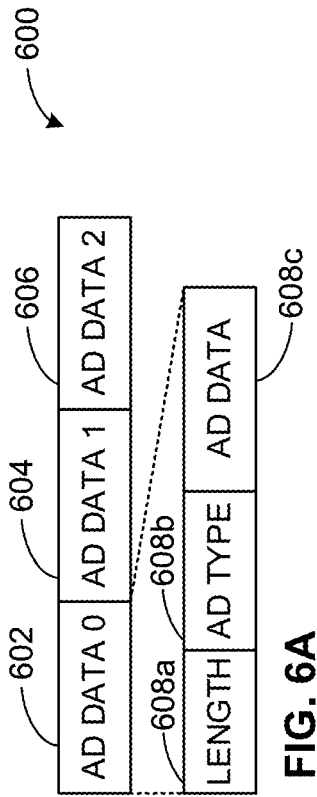
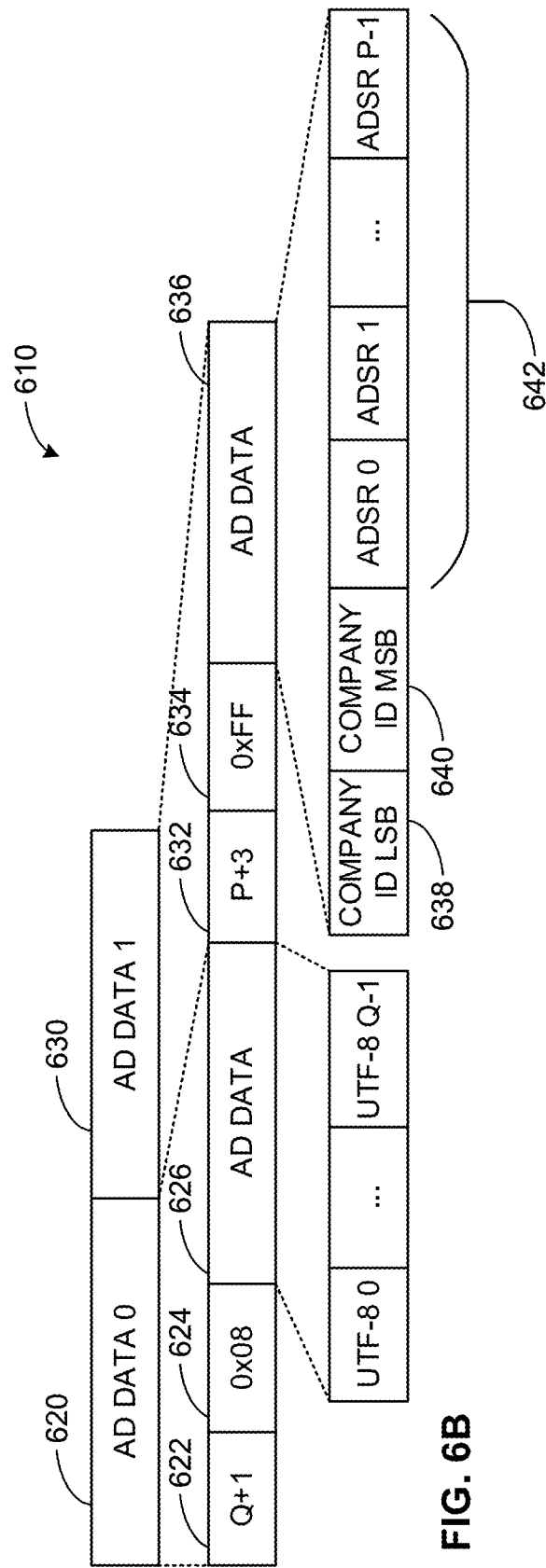
FIG. 6A
FIG. 6B

| DESCRIPTION | ADVDATA INDEX | VALUES | NOTES |
|---|---|---|---|
| AD DATA 0 | | | |
| LENGTH | [0] | Q+1 | |
| AD TYPE | [1] | 0x08 | <<SHORTENED LOCAL NAME>> |
| AD DATA | [2] | | UTF-8 CHAR 0 |
| | [3] | | UTF-8 CHAR 1 |
| | ... | | ... |
| | [2+Q+1] | | UTF-8 CHAR Q-1 |
| AD DATA 1 | | | OPTIONAL |
| LENGTH | [2+Q] | P+3 | |
| AD TYPE | [3+Q] | 0xFF | <<MANUFACTURER SPECIFIC DATA>> |
| AD DATA | [4+Q] | 0XDF | COMPANY X ID LSB |
| | [5+Q] | 0X04 | COMPANY X ID MSB |
| | [6+Q] | | ADSR BYTE 0 |
| | ... | | ... |
| | [6+Q+P-1] | | ADSR BYTE P-1 |

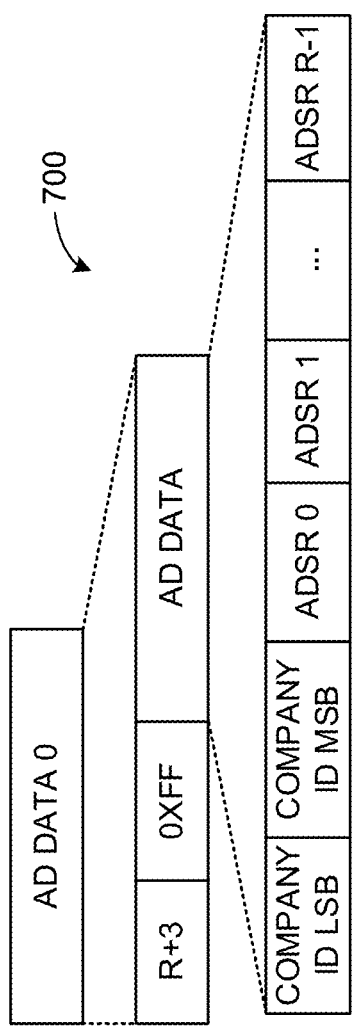

|  | IDENTIFIER | IMPLIED LENGTH | ADDITIONAL DATA | | |
|---|---|---|---|---|---|
|  |  |  | BYTE LENGTH | DATA | NOTES |
| PROTOCOL | | | | | |
| HART 5 | 0X00 | 0X00 | | | |
| HART 6 | 0X01 | 0X00 | | | |
| HART 7 | 0X02 | 0X00 | | | |
| RFU | 0X03 | 0X00 | | | |
| FOUNDATION FIELDBUS | 0X04 | 0X00 | | | |
| PROFIBUS PA | 0X05 | 0X00 | | | |
| MODBUS | 0X06 | 0X00 | | | |
| CUSTOM | 0X07 | 0X02 | [0] | UINT8 | IDENTIFIER LSB |
|  |  |  | [1] | UINT8 | IDENTIFIER MSB |
| DEVICE INFORMATION | | | | | |
| DEVICE INFORMATION | 0X08 | 0X06 | [0-2] | MFR ID | |
|  |  |  | [3-4] | DEVICE TYPE | |
|  |  |  | [5] | DEVICE REV | |
| COMMON | | | | | |
| CURRENT | 0X09 | 0X02 | [0-1] | FLOAT16 | MA |
| SET POINT | 0X0A | 0X02 | [0-1] | FLOAT16 | % |
| VALVE POSITION | 0X0B | 0X02 | [0-1] | FLOAT16 | % |
| SERIAL NUMBER | 0X0C | 0X0A | [0-9] | UINT8[10] | UTF-8 |
| VALVE SPECIFIC | | | | | |
| SUPPLY PRESSURE | 0X0D | 0X02 | [0-1] | FLOAT16 | PSI |
| PRESSURE 1 | 0X0E | 0X02 | [0-1] | FLOAT16 | PSI |
| PRESSURE 2 | 0X0F | 0X02 | [0-1] | FLOAT16 | PSI |
| TRAVEL | 0X10 | 0X02 | [0-1] | FLOAT16 | % |
| DEVIATION | 0X11 | 0X02 | [0-1] | FLOAT16 | |
| CYCLE COUNT | 0X12 | 0X02 | [0-1] | FLOAT16 | |
| TRANSMITTER SPECIFIC | | | | | |
| FLOW RATE | 0X13 | 0X02 | [0-1] | FLOAT16 | GAL/MIN |
| TEMPERATURE | 0X14 | 0X02 | [0-1] | FLOAT16 | DEG CELSIUS |
| PRESSURE | 0X15 | 0X02 | [0-1] | FLOAT16 | PSI |
| ALERTS | | | | | |
| ALERT LEVEL | 0X16 | 0X05 | [0-4] | UINT8 | |
| PROTOCOL SPECIFIC | | | | | |
| HART GENERIC 1 | 0X17 | 0X02 | [0-1] | UINT8[2] | 1 BYTE CMD, 1 BYTE DATA |
| HART GENERIC 2 | 0X18 | 0X03 | [0-2] | UINT8[3] | 1 BYTE CMD, 2 BYTE DATA |
| HART GENERIC 3 | 0X19 | 0X04 | [0-3] | UINT8[4] | 1 BYTE CMD, 3 BYTE DATA |
| HART GENERIC 4 | 0X20 | 0X05 | [0-4] | UINT8[5] | 1 BYTE CMD, 4 BYTE DATA |

FIG. 8

| MANUFACTURER COMMAND SERVICE DATA ATTRIBUTES ~1000 | | |
|---|---|---|
| PROPERTY | INDEX | VALUE ~922 |
| DECLARATION | | |
| TYPE (16-BIT UUID) | [0] | 0x03 |
| | [1] | 0x28 |
| PERMISSIONS | | GATT_PERMIT_READ |
| PROPERTIES ~924 | | GATT_PROP_WRITE |
| | | GATT_PROP_WRITE_NO_RSP \| |
| | | GATT_PROP_NOTIFY |
| VALUE | | |
| TYPE (128-BIT UUID) | [0-15] | xx:xx: ... :xx, little endian |
| PERMISSIONS | | GATT_AUTHOR_READ \| |
| | | GATT_AUTHOR_WRITE \| |
| | | GATT_ENCRYPT_READ \| |
| | | GATT_ENCRYPT_WRITE |
| DATA ~926 | [0-244] | UINT8[244] ARRAY |
| DESCRIPTOR | | |
| TYPE (128-BIT UUID) | [0] | 0x02 |
| | [1] | 0x29 |
| PERMISSIONS | | GATT_PERMIT_AUTHOR_READ \| |
| | | GATT_PERMIT_AUTHOR_WRITE \| |
| | | GATT_PERMIT_ENCRYPT_READ \| |
| | | GATT_PERMIT_ENCRYPT_WRITE |
| DATA | UNIT16 | 0x0000 NOTIFICATIONS DISABLED |
| | | 0x0001 NOTIFICATIONS ENABLED |
| | | 0x0002 – 0XFFFF REJECTED |

FIG. 10

| RX FLOW CONTROL ATTRIBUTES | | | |
|---|---|---|---|
| PROPERTY | INDEX | VALUE | 922 |
| DECLARATION | | | |
| TYPE (16-BIT UUID) | [0] | 0x03 | |
| | [1] | 0x28 | |
| PERMISSIONS | | GATT_PERMIT_READ | |
| PROPERTIES 924 | | GATT_PROP_READ \| | |
| | | GATT_PROP_NOTIFY | |
| VALUE | | | |
| TYPE (128-BIT UUID) | [0-15] | xx:xx: ... :xx, little endian | |
| PERMISSIONS | | GATT_AUTHOR_READ \| | |
| DATA 926 | [0] | 0X00 – FIELD DEVICE XOFF (REMOTE DEVICE CANNOT SEND DATA | |
| | | 0X01 – FIELD DEVICE XOFF (REMOTE DEVICE CANNOT SEND DATA | |
| DESCRIPTOR | | | |
| TYPE (128-BIT UUID) | [0] | 0x02 | |
| | [1] | 0x29 | |
| PERMISSIONS | | GATT_PERMIT_ AUTHOR_READ \| | |
| | | GATT_PERMIT_AUTHOR_WRITE \| | |
| | | GATT_PERMIT_ENCRYPT_READ \| | |
| | | GATT_PERMIT_ENCRYPT_WRITE | |
| DATA | UNIT16 | 0x0000  NOTIFICATIONS DISABLED | |
| | | 0x0001  NOTIFICATIONS ENABLED | |
| | | 0x0002 – 0XFFFF REJECTED | |

| COMMAND PROTOCOL | | | |
|---|---|---|---|
| BYTE | FIELDS | DESCRIPTION | |
| DECLARATION | | | |
| [0] | OPCODE | | |
| [1] | PAYLOAD | PAYLOAD BYTE 0 | |
| [1 + N -1] | PAYLOAD | PAYLOAD BYTE N - 1 | |

FIG. 12A

| API COMMAND LIST | | |
|---|---|---|
| DESCRIPTION | PERMISSION | OPCODE |
| SYSTEM_PING | ADMIN | 0x00 |
| SYSTEM_REBOOT | ADMIN | 0x01 |
| SYSTEM_GET_FIRMWARE_VERISON | ADMIN | 0x02 |
| SYSTEM_TX_POWER | ADMIN | 0x03 |
| SYSTEM_GET_UART_PARAMETERS | ADMIN | 0x04 |
| GAP_GET_DEVICE_NAME | ENGINEER | 0x05 |
| GAP_SET_DEVICE_NAME | ENGINEER | 0x06 |
| GAP_GET_ADV_PARAMETERS | ENGINEER | 0x07 |
| GAP_SET_ADV_PARAMETERS | ENGINEER | 0x08 |
| GAP_GET_SCAN_PARAMETERS | ENGINEER | 0x09 |
| GAP_SET_SCAN_PARAMETERS | ENGINEER | 0x0A |
| GAP_GET_CONN_PARAMETERS | ENGINEER | 0x0B |
| GAP_SET_CONN_PARAMETERS | ENGINEER | 0x0C |
| FIELD_DEVICE_GET_INFO | USER | 0x0D |
| MFR_SPECIFIC_0 | USER | 0x0E |
| ⋮ | ⋮ | ⋮ |
| MFR_SPECIFIC_31 | USER | 0x2D |
| GATT_COMMAND | USER | 0x2E |
| GATT_FLOW_CONTROL | USER | 0x2F |

FIG. 12B

| SYSTEM_PING PROTOCOL FORMAT ||||| 1220 |
|---|---|---|---|---|
| TYPE | LENGTH | OP CODE | BYTE INDEX | VALUE |
| | | | PAYLOAD ||
| CMD | 0x00 | 0x00 | | |
| RSP | 0x06 | 0x00 | [0 - 3] | UNIT32 – SECONDS SINCE REBOOT |
| | | | [4 - 5] | UNIT16 – FRACTIONS OF A SECOND (1/32768 SEC) |

FIG. 12C

METHODS AND APPARATUS TO BRIDGE COMMUNICATIONS BETWEEN DEVICES USING LOW-ENERGY DEVICES

RELATED APPLICATION

This patent arises from an application claiming the benefit of U.S. Provisional Patent Application Ser. No. 62/567,051, which was filed on Oct. 2, 2017. U.S. Provisional Patent Application Ser. No. 62/567,051 is hereby incorporated herein by reference in its entirety. Priority to U.S. Provisional Patent Application Ser. No. 62/567,051 is hereby claimed.

FIELD OF THE DISCLOSURE

This disclosure relates generally to process control systems, and, more particularly, to methods and apparatus to bridge communications between devices using low-energy devices.

BACKGROUND

Industrial communication protocols are implemented to manage industrial process control operations associated with field devices and other types of process equipment located in industrial process control environments. Examples of such industrial communication protocols include the Highway Addressable Remote Transducer (HART) communication protocol, the PROFIBUS communication protocol, the FOUNDATION Fieldbus communication protocol, the MODBUS communication protocol, etc.

Bluetooth Low Energy (BLE) communication protocols are implemented as wireless personal area network communication protocols that facilitate wireless communications between BLE-compatible devices. Examples of such BLE-compatible devices commonly include desktop computers, laptop computers, tablets, smartphones, and personal digital assistants (PDAs). Conventionally, data formatted according to BLE communication protocols is not compatible with data formatted according to the above-described industrial communication protocols.

SUMMARY

Methods and apparatus to bridge communications between devices using low-energy devices are disclosed herein. In some disclosed examples, an apparatus includes a field device including a network bridge, the network bridge to convert first data received at a first Bluetooth Low Energy (BLE) radio of the network bridge, over a BLE network, from a second BLE radio of a remote device, and formatted according to a BLE communication protocol, into second data formatted according to an industrial communication protocol.

In some disclosed examples, a method includes converting, by executing one or more machine readable instructions via a network bridge of a field device, first data received at a first Bluetooth Low Energy (BLE) radio of the network bridge, over a BLE network, from a second BLE radio of a remote device, and formatted according to a BLE communication protocol, into second data formatted according to an industrial communication protocol.

In some disclosed examples, a non-transitory readable storage medium comprising instructions is disclosed. In some disclosed examples, the instructions, when executed, cause a machine to at least convert first data received at a first Bluetooth Low Energy (BLE) radio of the network bridge, over a BLE network, from a second BLE radio of a remote device, and formatted according to a BLE communication protocol, into second data formatted according to an industrial communication protocol.

BRIEF DESCRIPTION OF THE DRAWINGS

FIG. 6A is an example block diagram depicting an example implementation of an example BLE advertising data format.

FIG. 6B is an example block diagram depicting an example implementation of another example BLE advertising data format.

FIG. 6C is an example table depicting an example structure of the example BLE advertising format of FIG. 6B.

FIG. 7A is an example block diagram depicting an example implementation of an example BLE scan response data format.

FIG. 7B is an example table depicting an example structure of the example BLE scan response data format of FIG. 7A.

FIG. 8 is an example table depicting example advertising and scan response data corresponding to the example BLE advertising format of FIG. 6B and the example BLE scan response data format of FIG. 7A.

FIG. 10 is an example table depicting example command service data attributes corresponding to an example data characteristic structure.

FIG. 11 is an example table depicting example receive flow control data attributes corresponding to an example receive flow control structure.

FIG. 12A is an example table depicting example command protocol Application Program Interface (API) command data.

FIG. 12B is another example table depicting example command protocol API command data.

FIG. 12C is an example table depicting an example format of an example API command and an example API response.

The figures are not to scale. Wherever possible, the same reference numbers will be used throughout the drawing(s) and accompanying written description to refer to the same or like parts.

DETAILED DESCRIPTION

Figure 1:
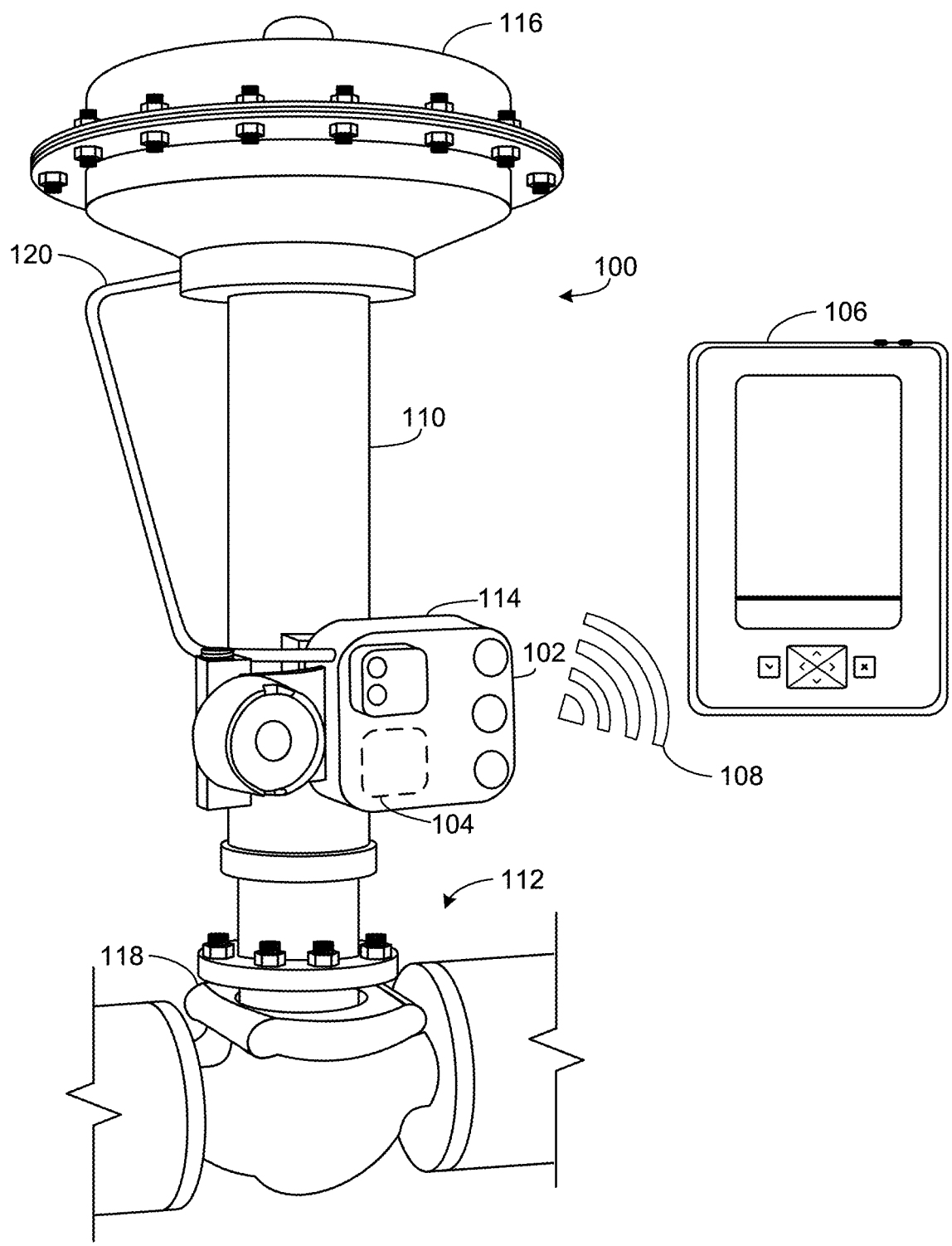
FIG. 1 is a schematic illustration of an example environment including an example field device having an example network bridge to bridge communications between the field device and an example remote device over an example BLE network in accordance with the teachings of this disclosure.

In recent years, Bluetooth® technology has become increasingly utilized in industrial applications to facilitate communication between devices. Bluetooth is a wireless technology standard for exchanging data over short distances using short-wavelength ultra-high frequency radio waves in the industrial, scientific, and medical (ISM) radio bands (e.g., 2.4 to 2.4835 GHz). Conventional methods of implementing Bluetooth in industrial applications such as process control systems include communicatively coupling an industrial protocol communicator such as a Highway Addressable Remote Transducer (HART) modem to a typical Bluetooth radio (e.g., a Bluetooth radio whose operation is based on the Bluetooth Core Specification Version 5.0).

For example, a field device (e.g., a field device with a sufficient power budget to operate a Bluetooth radio) may encapsulate HART information within a Bluetooth packet and transmit the Bluetooth packet to a remote client, where the remote client receives the information via a typical Bluetooth radio communicatively coupled to a main processor via a bus. In such an example, the typical Bluetooth radios may transmit or receive information without concern for the available power budget. As used herein, the term "power budget" refers to an amount of electrical power (e.g., electrical power based on a voltage, a current, etc.) available to be used by a component of the field device to perform an operation (e.g., a process control operation, a BLE operation, a communication operation, etc.). For example, the remote client may transmit information using an entirety of the allowable power budget to increase a range and/or a data throughput of the typical Bluetooth radio.

Typically, standard Bluetooth radios have not been integrated into certain process control system field devices such as valve positioners or other low-power instruments due to power budget constraints. For example, a valve positioner may operate on a power budget based on a 4-20 milliamp current loop provided by an external data acquisition and control system. In such an example, the valve positioner may utilize a majority of the available power budget to perform a primary function (e.g., a primary process control function) of the valve positioner. In some examples, power constraints can be imposed on standard Bluetooth radios when the valve positioner utilizes the majority of the available power budget. In some examples, a standard Bluetooth integrated circuit utilizes approximately 150 milliwatts (mW) of power to function compared to an example power budget of less than 3 mW available on the valve positioner for a potential Bluetooth interface. For example, there may not be enough power available in the power budget of the valve positioner for the standard Bluetooth radio to use in providing an efficient communication pathway between the field device and another device (e.g., another field device, a remote device, etc.). As a result, a standard Bluetooth radio may not be an ideal choice for a low-powered field device to use for communication operations with another device based on a constrained or limited power budget of the low-powered field device.

Bluetooth Low Energy (Bluetooth LE or BLE) is a wireless communication technology based on standard Bluetooth technology (e.g., operates in the same spectrum range of 2.4-2.4835 GHz ISM band) intended to provide considerably reduced power consumption and cost while maintaining a similar communication range. BLE is structurally different from and is not compatible with classic Bluetooth. For example, BLE uses a different set of channels compared to classic Bluetooth. In such an example, BLE may have 40 2-MHz channels compared to classic Bluetooth's 79 1-MHz channels. In another example, BLE does not support Serial Port Profile (SPP) which is used to replace a serial communication interface (e.g., RS-232 communication, RS-485 communication, etc.).

Examples disclosed herein use BLE to form a communication bridge between one or more low-powered devices to improve interoperability of communication, reduce cost and complexity of performing the communication, and to increase a speed of the communication between the devices. In some disclosed examples, the BLE bridge apparatus facilitates communication between one or more client devices (e.g., an Emerson AMS TREX™) and a server device (e.g., a field device, a controller, a valve positioner, etc.). For example, the BLE bridge apparatus may be coupled and/or communicatively coupled to a field device such as a local controller, a headless controller (e.g., a PLC-type device), a valve positioner, a pressure transmitter, a temperature transmitter, a level transmitter, etc. For example, the BLE bridge apparatus may be used to establish peer-to-peer communications with one or more client devices, one or more field devices, etc., and/or a combination thereof.

In some disclosed examples, the field device is communicatively coupled to one or more remote devices such as the Emerson AMS Trex. For example, the remote device may include a process control related software application operating on a standard operating system (e.g., a Windows™-based operating system, an Apple macOS® operating system, an Android™ operating system, a Linux® operating system, etc.). In such an example, the remote device may communicate to the field device via BLE.

In some disclosed examples, the field device is communicatively coupled to one or more other field devices. For example, the field device may obtain information from the one or more other field devices via an industrial communication protocol and transmit the information to a remote device, a process control system, etc., via BLE or any other wired or wireless communication method. In some disclosed examples, the field device is communicatively coupled to the one or more other field devices via a wired or wireless industrial communication protocol such as a HART communication protocol, a WirelessHART (WiHART) communication protocol, a PROFIBUS communication protocol, a FOUNDATION Fieldbus communication protocol, or a MODBUS communication protocol.

Examples disclosed herein improve communication interoperability between devices because the BLE bridge apparatus can facilitate communication between (1) a field device using a conventional industrial communication protocol and (2) a remote device via BLE. Examples disclosed herein reduce cost and complexity because the BLE bridge apparatus can facilitate communication between field devices without additional specialized hardware to perform communication translation and transmission (e.g., an external communication gateway device and corresponding hardware such as a power supply, a circuit breaker, an enclosure, etc.). Examples disclosed herein can be implemented in a software application layer above the physical hardware layer of a BLE radio (e.g., a BLE transceiver) in a remote device. As a result, examples disclosed herein can improve interoperability between the remote device and the field device as the remote device can use any conventional operating system and any conventional BLE radio.

In some disclosed examples, the BLE bridge apparatus facilitates a transmission of information from the field device to the remote device. The field device may support an industrial communication protocol such as HART protocol. For example, the HART protocol defines a data packet to be structured based on the Bell 202 Modem Standard. As a result, HART data packet supporting information (e.g., a HART preamble, a HART address, etc.) do not need to be sent to the remote device via BLE. For example, the HART preamble is used for carrier detection and synchronization per the Bell 202 Modem Standard and does not need to be included in the BLE data packet since there are no Bell 202 modems to detect or synchronize. For example, the BLE bridge apparatus may receive a HART protocol data packet from the field device, remove HART protocol information from the HART protocol data packet, and transmit payload data (e.g., transmit only payload data) of the HART protocol data packet to the remote device via BLE. In such an example, the remote device may reconstruct the HART protocol data packet including the payload data and transmit the reconstructed HART protocol data packet to an application operating on the remote device.

In some disclosed examples, the BLE bridge apparatus facilitates a transmission of information from the remote device to the field device. The example BLE bridge apparatus may identify one or more protocols supported by the field device. In response to receiving a receive request from the BLE radio, the BLE bridge apparatus determines whether the receive request corresponds to a protocol supported by the field device. In response to determining that the receive request corresponds to a supported protocol, the BLE bridge apparatus approves the receive request and receives one or more data packets from the remote device. The example BLE bridge apparatus removes BLE information from the received data packets, adds supported-protocol information (e.g., a HART protocol preamble, a HART protocol address, etc.) to the received data packets, and transmits the processed data packets to a microcontroller unit (MCU) of the field device via a UART terminal, an I2C bus, a SPI bus, etc. For example, the MCU may be a processor executing one or more process control operations (e.g., measuring a valve position, transmitting information via an industrial communication protocol, etc.) of the field device. In some disclosed examples, the BLE bridge apparatus removes BLE information from a data packet received from the remote device and transmits the data packet to the MCU of the field device without adding supported-protocol information to the data packet.

In some disclosed examples, receiving a data packet from the remote device with protocol information removed increases a data receiving rate based on a constrained power budget. For example, additional information can be transmitted in place of the protocol information to the field device. In some disclosed examples, transmitting a data packet to the remote device with protocol information removed increases a data transmission rate based on the constrained power budget. For low-powered field devices where an available power budget is constrained, the example BLE bridge apparatus may reduce an amount of non-data payload information such as protocol information to increase the data transmission rate between the field device and the remote device.

FIG. 1 is a schematic illustration of an example environment 100 including an example field device 102 having an example network bridge 104 such as an example BLE bridge to bridge communications between the field device 102 and an example remote device 106 over an example BLE network 108. In the illustrated example, the field device 102 is coupled to a fluid flow control assembly 110 operating in a process control environment 112. The fluid flow control assembly 110 of the illustrated example is a pneumatically actually valve assembly.

In the illustrated example, the enclosure 114 is coupled to the fluid flow control assembly 110, which includes at least an actuator 116 and a valve 118 (e.g., a butterfly valve, a globe valve, etc.). The actuator 116 of the illustrated example is activated via changes in pneumatic pressure from a pneumatic tube connection 120. However, other valve assemblies may additionally or alternatively be used, such as an electrically actuated valve assembly, a hydraulically actuated valve assembly, etc. Although the example BLE bridge 104 is included in the enclosure 114 in the illustrated example, alternatively the example BLE bridge 104 may be located elsewhere.

In the illustrated example, the field device 102 is a valve controller. Alternatively, the example field device 102 may be a controller (e.g., a local single-loop process controller), a pressure transmitter, a temperature transmitter, a level transmitter, a pH transmitter, valve positioner, etc. The field device 102 of the illustrated example controls, measures and/or monitors one or more process control operation(s) associated with the fluid flow control assembly 110. For example, the field device 102 may be implemented as a controller that controls, measures and/or monitors the operation of the actuator 116 operatively coupled to the valve 118 and transmits the information corresponding to the operation to an external device such as the remote device 106. In such an example, the controller may control the operation of the actuator 116 and/or the position of the valve 118 (e.g., the extent to which the valve is opened or closed via the actuator 116).

In the illustrated example, the field device 102 controls, measures and/or monitors the one or more process control operation(s) associated with the fluid flow control assembly 110 (e.g., open the valve 118, calibrate the valve 118, etc.) based on data (e.g., control commands, control signals, etc.) formatted according to an industrial communication protocol and communicated to and/or from the field device 102 over an industrial communication network. In some examples, the industrial communication protocol can be one of a HART communication protocol, a PROFIBUS communication protocol, a FOUNDATION Fieldbus communication protocol, or a MODBUS communication protocol.

In the illustrated example, the field device 102 communicates with the remote device 106 using the BLE bridge 104 via the BLE network 108. In the illustrated example, an antenna 122 is embedded in a front panel of the field device 102 (e.g., in a front panel of the enclosure 114). In some examples, the field device 102 communicates field device information to the remote device 106 such as process control parameters corresponding to the fluid flow control assembly (e.g., an actuator pressure, a supply pressure, a valve position, etc.). In some examples, the field device 102 communicates field device information to the remote device 106 such as configuration information, diagnostic information, etc., of the field device 102 (e.g., an identity of logged-in users to the field device 102, an internal event log, a calibration version of the controller, a firmware version of the controller, a model number of the fluid flow control assembly 110, etc.). In some examples, the field device 102 communicates field device information to the remote device 106 such as alert information (e.g., a calibration error, a missing position feedback alert, a low supply pressure alarm, a security exception, a security exception using a port of the BLE radio, etc.).

In some examples, the remote device 106 communicates information to the field device 102 using the BLE bridge 104 via the BLE network 108. For example, the remote device 106 may obtain configuration information from the field device 102 such as a firmware version of the controller. In response to the remote device 106 determining that the firmware version is not current, the remote device 106 may download a current version of the firmware to the field device 102. In another example, the remote device 106 may configure one or more parameters of the fluid flow control assembly 110 via the BLE network 108. For example, the remote device 106 may adjust an overpressure alarm setting, a unit of measure parameter, a process control variable minimum and/or maximum range setting, etc.

Performing such actions (e.g., downloading firmware, changing a setting, calibrating the field device 102, etc.) wirelessly reduces a complexity of performing operations (e.g., maintenance operations) on the fluid flow control assembly 110. For example, in absence of the BLE network 108, a hot work permit may need to be obtained to open the enclosure 114 to access the controller. In another example, process control operations in the process control environment 112 may need to be shut down prior to performing work on the field device 102 to prevent potential electric sparks from causing an explosion in a hazardous gas atmosphere. The example BLE bridge 104 reduces complexity of maintenance operations by facilitating communication between the field device 102 and the remote device 106 via the BLE network 108.

Figure 2:
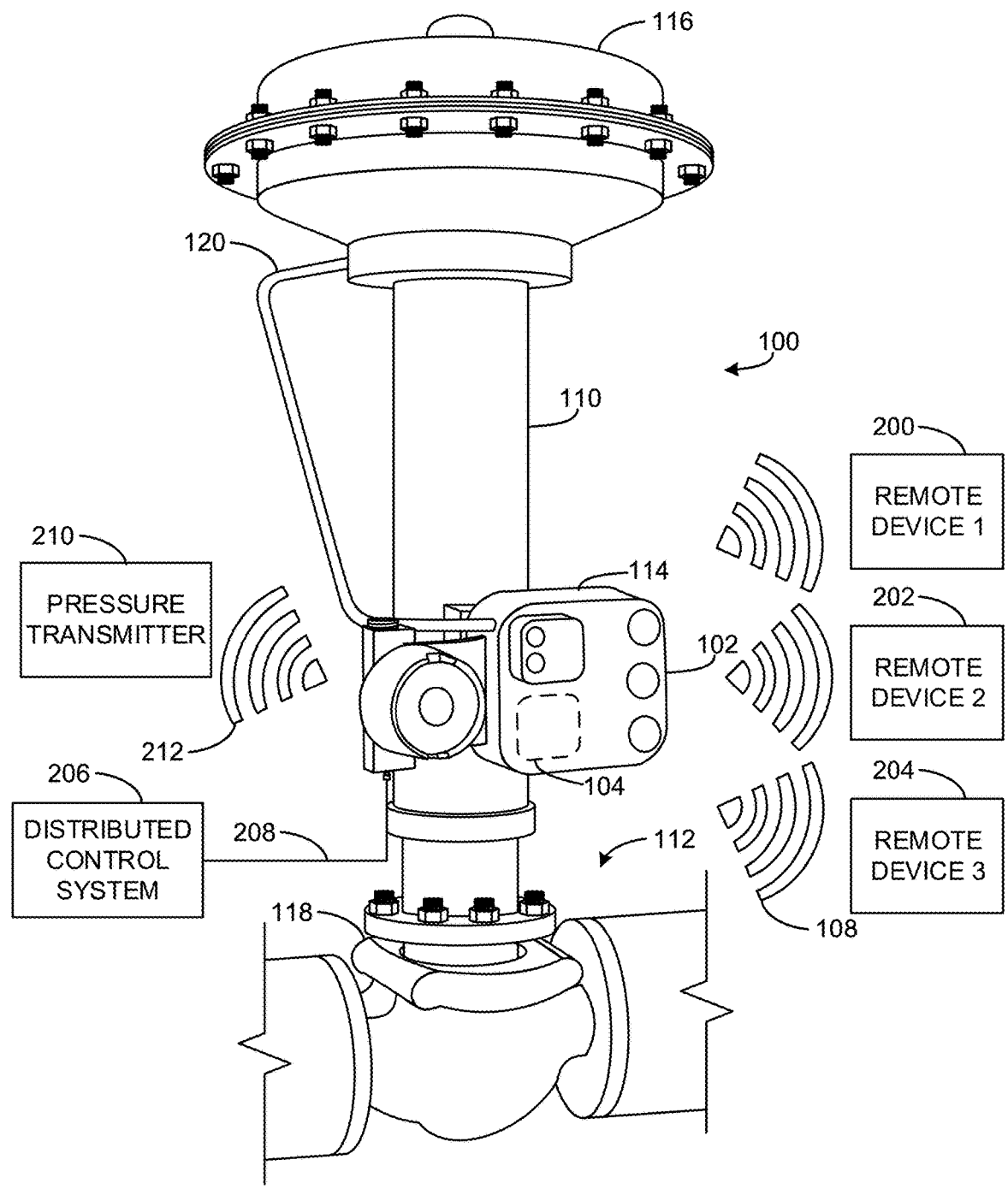
FIG. 2 is another schematic illustration of the example environment of FIG. 1 including the example field device of FIG. 1 having an example network bridge to bridge communications between the field device and first through third example remote devices over an example BLE network in accordance with the teachings of this disclosure.

FIG. 2 is another schematic illustration of the example environment 100 of FIG. 1 including the example field device 102 of FIG. 1 having the example network bridge 104 of FIG. 1 to bridge communications between Field Device 1 200, Field Device 2 202, and Field Device 3 204. In the illustrated example, the BLE bridge 104 is processing (e.g., capable of processing, capable of simultaneously processing, etc.) multiple BLE communication connections between the field device 102 and the Remote Devices 1-3 200, 202, 204. For example, the field device 102 may transmit field device information to one or more of the Remote Devices 1-3 200, 202, 204 and/or receive information (e.g., a firmware executable, a configuration setting, etc.) from one or more of the Remote Devices 1-3 200, 202, 204. Although only the Remote Devices 1-3 200, 202, 204 are depicted in FIG. 2, fewer or more than the Remote Devices 1-3 200, 202, 204 may be used.

In the illustrated example, the field device 102 is communicatively coupled to a distributed control system (DCS) 206. For example, the DCS 206 may include one or more data acquisition and control systems including one or more controllers. The field device 102 of the illustrated example is communicatively coupled to the DCS 206 via a cable 208 that includes one or more wires. Additionally or alternatively, the example field device 102 may be connected to the DCS 206 via a wireless connection. For example, the field device 102 may communicate with the DCS 206 via the cable 208, a WirelessHART (WiHART) connection, a Wi-Fi Direct® network, etc., and/or a combination thereof. Alternatively, the example field device 102 may communicate with one or more of the Remote Devices 1-3 200, 202, 204 via the BLE bridge 104 while not being communicatively coupled to the DCS 206.

In the illustrated example, the field device 102 is communicatively coupled to a pressure transmitter 210 via a wireless connection 212. For example, the pressure transmitter may be a ROSEMOUNT™ 3051S Wireless Differential Pressure Flow Transmitter. Alternatively, the pressure transmitter 210 may be any other type of field device such as a flow rate transmitter, a temperature transmitter, a valve positioner, etc. The wireless connection 212 of the illustrated example is a WiHART connection. Alternatively, any other wireless connection may be used. In the illustrated example, the field device 102 transmits information to the pressure transmitter 210 and receives information from the pressure transmitter 210. For example, the pressure transmitter 210 may transmit information (e.g., a pressure measurement, a diagnostic of the pressure transmitter 210, a configuration parameter of the pressure transmitter 210, etc.) to the field device 102.

Figure 3:
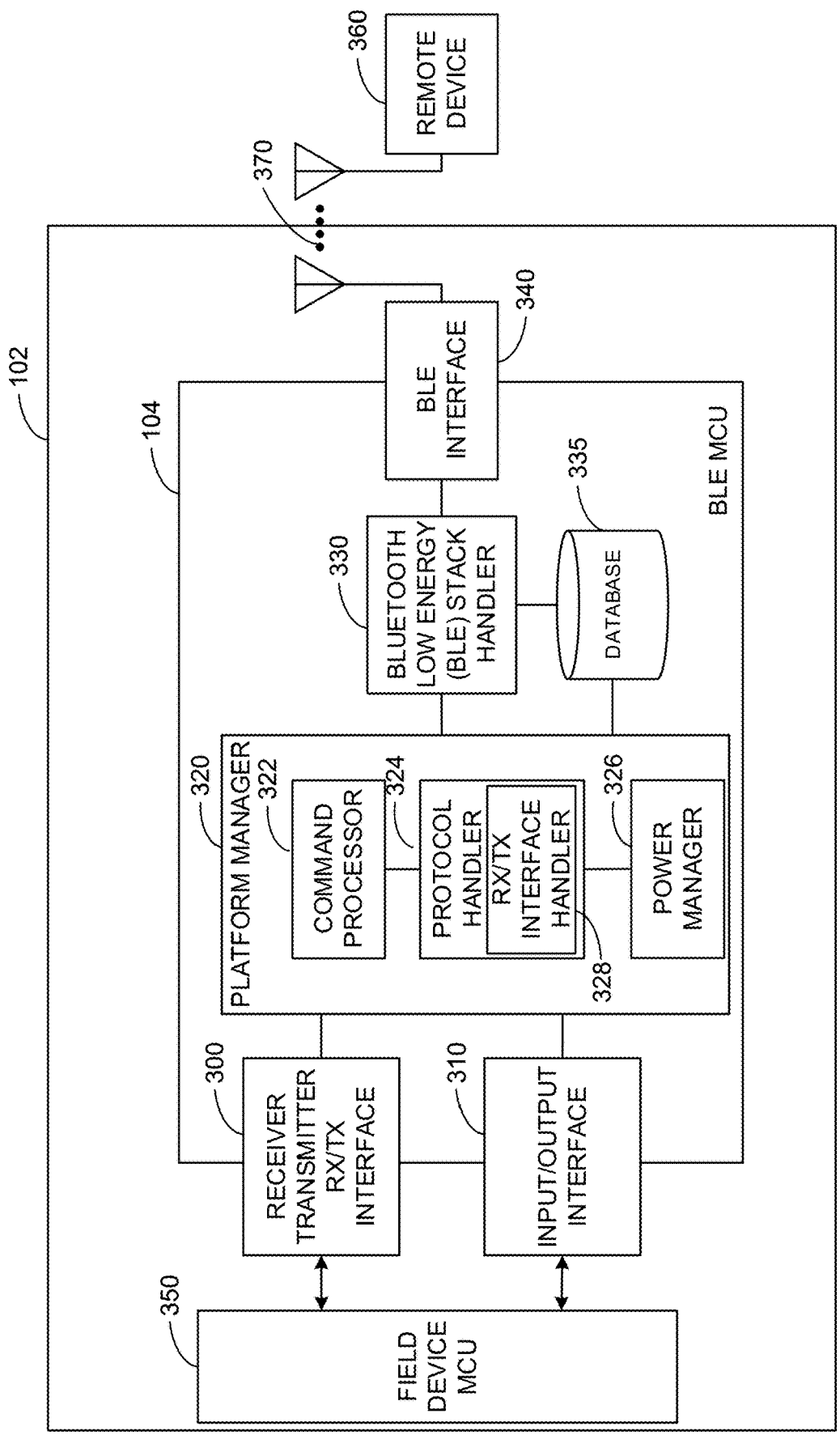
FIG. 3 is a block diagram of an example implementation of the BLE bridge apparatus of FIGS. 1-2.

FIG. 3 is an example block diagram of an example implementation of the BLE bridge 104 of FIGS. 1-2 of the field device 102 of FIGS. 1-2. In the illustrated example, the BLE bridge 104 includes an example receiver transmitter (RX/TX) interface 300, an example input/output interface 310, an example platform manager 320, an example Bluetooth Low Energy (BLE) stack handler 330, an example database 335, and an example BLE interface 340. The platform manager 320 of the illustrated example includes an example command processor 322, an example protocol handler 324, and an example power manager 326. The protocol handler 324 of the illustrated example includes a RX/TX interface handler 328. Further shown are an example field device MCU 350, an example remote device 360, and an example BLE network 370.

In the illustrated example of FIG. 3, the BLE bridge 104 is an MCU used to execute communication operations between the field device MCU 350 and an external BLE-compatible device such as the remote device 360. The BLE interface 340 of the illustrated example facilitates BLE communication via a BLE network 370. The BLE bridge 104 of the illustrated example is included in the field device 102. In some examples, data packets transmitted from the field device MCU 350 to the BLE bridge 104 are in a format defined by an industrial communication protocol supported by the field device 102. For example, the field device 102 may support HART protocol. In such an example, the field device MCU 350 may transmit data packets to the BLE bridge 104 via the receiver transmitter interface 300 and/or the input/output interface 310 in a HART protocol format.

In the illustrated example, the BLE bridge 104 includes the receiver transmitter interface 300 to enable communication between the BLE bridge 104 and the field device MCU 350. The receiver transmitter interface 300 of the illustrated example is a UART. For example, the receiver transmitter interface 300 may transmit information to and/or receive information from the field device MCU 350 using an industrial communication protocol (e.g., a HART communication protocol, a PROFIBUS communication protocol, a WiHART communication protocol, etc.). Alternatively, the example receiver transmitter interface 300 may be an inter-integrated circuit (I2C) bus, a serial peripheral interface (SPI) bus, or other similar interface between integrated circuits (e.g., microcontrollers, processors, etc.).

In the illustrated example of FIG. 3, the BLE bridge 104 includes the input/output interface 310 to enable communication between the BLE bridge 104 and the field device MCU 350. The input/output interface 310 of the illustrated example is an analog-to-digital converter. For example, the input/output interface 310 may transmit a current signal, a voltage signal, etc., to the field device MCU 350 corresponding to information obtained from the remote device 360. Alternatively, the example input/output interface 310 may be a general-purpose input/output (GPIO) interface or any other type of input/output interface.

In the illustrated example of FIG. 3, the BLE bridge 104 includes the platform manager 320 to analyze and generate commands, convert data packets based on identified protocols, and/or manage a power budget of the BLE bridge 104. In the illustrated example, the platform manager 320 includes the command processor 322 to determine and direct a communication operation based on a direction of data flow. In some examples, the command processor 322 identifies one or more supported protocols of the field device 102. For example, the command processor 322 may determine that the field device 102 supports HART communication protocol and PROFIBUS communication protocol. In such an example, the command processor 322 may obtain the supported protocols by querying the field device MCU 350, by querying the database 335, etc. For example, the command processor 322 may obtain the supported protocols in response to querying the field device MCU 350. In such an example, the command processor 322 may store information or a value corresponding to the identified supported protocols in the database 335 for future retrieval by the command processor 322. In another example, the command processor 322 may determine the supported protocols based on querying a hard-coded parameter stored in the database 355 corresponding to the supported protocols of the field device 102.

In some examples, the command processor 322 determines a direction of data flow based on a master and slave communication model. For example, the command processor 322 may determine that a data packet corresponds to a transmit request from the receiver transmitter interface 300 (e.g., a slave transmitting a notification to a master). In such an example, the command processor 322 may direct the data packet to be processed and transmitted from the receiver transmitter interface 300 to the BLE stack handler 330. In another example, the command processor 322 may determine that a data packet corresponds to a receive request from the BLE interface 340 (e.g., a master transmitting a data packet to a slave without requiring a response from the slave). In such an example, the command processor 322 may direct the data packet to be processed and transmitted from the BLE interface 340 to the receiver transmitter interface 300.

In some examples, the command processor 322 evaluates read and write BLE requests based on security information (e.g., security permissions, security rules, etc.). For example, the command processor 322 may determine that a receive request is authorized based on comparing an opcode of the receive request to a list of authorized opcodes. In such an example, the command processor 322 may reject the receive request when the command processor 322 determines that the opcode is not authorized. For example, an unauthorized opcode may indicate that a user transmitting information to the field device 102 via the BLE bridge 104 is not permitted to access information, change information, etc., on the field device 102.

In some examples, the command processor 322 executes communication operations of the BLE bridge 104 based on determining whether a value of an opcode corresponds to a specific industrial communication protocol. For example, the command processor 322 may determine that a value of an opcode corresponding to a receive request at the BLE interface 340 corresponds to HART protocol. The example command processor 322 may determine that the field device 102 supports HART protocol. In such an example, the command processor 322 may direct the BLE interface 340 to receive the information from the remote device 360 based on the comparison of the protocol indicated by the opcode value to the supported protocol of the field device 102. In some examples, the command processor 322 rejects the receive request based on a mismatch of the protocol indicated by the opcode value and the supported protocol(s) of the field device 102. In some examples, the command processor 322 directs a processing of a data packet received from the field device MCU 350 and/or the remote device 360 by calling the protocol handler 324 to perform one or more operations.

In some examples, the command processor 322 processes a radio specific command. For example, the command processor 322 may process a command described below in connection with FIG. 12B. For example, the command processor 322 may direct the BLE stack handler 330 to adjust or change the transmit power levels of the BLE interface 340. For example, the command processor 322 may direct the BLE stack handler 330 to reduce the transmit power level of the BLE interface 340 to conserve power. In another example, the command processor 322 may direct the BLE stack handler 330 to increase the transmit power level of the BLE interface 340 to increase a transmission range of the BLE interface 340. In some examples, the command processor 322 processes a radio specific command by executing a filter (e.g., a notch-filter) when the command processor 322 detects a problem with existing radio frequencies of the BLE interface 340. In some examples, the command processor 322 processes a radio specific command by turning off the BLE interface 340 completely to go into a full-radio-silence mode.

In the illustrated example of FIG. 3, the platform manager 320 includes the protocol handler 324 to execute communication operations based on a direction of data flow between the field device MCU 350 and the remote device 360. In some examples, the protocol handler 324 executes communication operations based on data flow from the field device MCU 350 to the BLE bridge 104. In such examples, the protocol handler 324 determines whether a data packet for transmission is a first data packet for a communication session. For example, in response to determining that the data packet is the first data packet of the communication session, the protocol handler 324 may read and store a protocol address (e.g., a HART protocol address, a PROFIBUS address, etc.) of the field device MCU 350. In response to determining that the data packet is not the first data packet of the communication session, the example protocol handler 324 may remove a protocol address from the data packet.

In some examples, the protocol handler 324 includes the protocol address in the data packet to be transmitted to the remote device 106 for industrial communication protocol data packet reconstruction. For example, the first data packet to be transmitted to the remote device 106 may include the protocol address which the remote device 106 may use for future communication operations. Alternatively, the remote device 106 may transmit a read request to the field device 102 including an opcode that returns the protocol-specific address. Alternatively, the example protocol handler 324 may define an opcode that returns HART messages with addresses and an opcode that returns HART messages without addresses. For example, the remote device 106 may transmit an opcode to cause the field device 102 to return a HART message with an address of the field device 102. In such an example, the protocol handler 324 may remove the protocol information such as the HART preamble, the message integrity checks, etc., and move the HART address into a data payload of the BLE packet to be transmitted to the remote device 106 for data packet reconstruction.

In some examples, the protocol handler 324 removes protocol information from a data packet prior to transmitting the data packet via the BLE interface 340. For example, the field device MCU 350 may transmit a HART 5 formatted data packet to the protocol handler 324. In such an example, the protocol handler 324 may remove HART 5 protocol information such as a HART 5 protocol preamble, a HART 5 protocol address, a HART 5 message integrity check, etc., from the HART 5 formatted data packet. In response to removing the protocol information from the data packet, the example protocol handler 324 may direct the BLE stack handler 330 to transmit the BLE data packet via the BLE interface 340.

In some examples, the protocol handler 324 adds protocol information such as a protocol preamble, a protocol address, and a protocol message integrity check based on a supported protocol of the field device 102. For example, the BLE interface 340 may receive a data packet from the remote device 106 including an identifier corresponding to HART 7 protocol. In such an example, the protocol handler 324 may add HART 7 protocol information such as a HART 7 protocol preamble, a HART 7 protocol address, a HART 7 message integrity check, etc., to the received data packet. In response to adding the protocol information to the received data packet, the example protocol handler 324 may direct the receiver transmitter interface 300 to transmit the processed data packet (e.g., the received data packet with the added protocol information) to the example field device MCU 350.

In some examples, the protocol handler 324 executes communication operations based on data flow from the remote device 360 to the BLE bridge 104. In such examples, the protocol handler 324 determines whether a data packet received at the BLE interface 340 is valid or properly formed, formatted, etc. In some examples, the example protocol handler 324 protects the field device MCU 350 from intentionally malformed data or partially malformed data (e.g., fuzzing) by determining whether the data packet is properly formed.

In some examples, the protocol handler 324 determines whether the data packet is properly formed based on evaluating an industrial protocol command. For example, the protocol handler 324 may receive a data packet including an industrial protocol command. In such an example, the protocol handler 324 may determine that the industrial protocol command is valid (e.g., HART command 0 is valid) or not valid (e.g., HART command 255 is not valid). The example protocol handler 324 may accept the data packet based on verifying that the industrial protocol command is valid or reject the data packet based on not verifying that the industrial protocol command is valid.

In some examples, the protocol handler 324 determines whether the data packet is properly formed based on evaluating a data length (e.g., a number of bytes) corresponding to an industrial protocol command. For example, the protocol handler 324 may receive a data packet including an industrial protocol command with a corresponding data length of 8 bytes. In such an example, the protocol handler 324 may determine that the industrial protocol command is defined by a maximum of 6 bytes to be properly formed. The example protocol handler 324 may compare the received data length of 8 bytes to the defined properly formed length of 6 bytes and determine that the data packet is not properly formed based on the comparison. In such an example, the protocol handler 324 may reject the data packet and/or transmit an error code to a transmitter of the data packet based on determining that the data packet is not properly formed.

In some examples, the protocol handler 324 determines whether the data packet is properly formed based on evaluating a range of a parameter value. For example, the protocol handler 324 may receive a data packet including a value for a valve position setpoint parameter of 2000%. In such an example, the protocol handler 324 may determine that the valve position setpoint parameter is defined by a range of 0-100% to be properly formed. The example protocol handler 324 may compare the received range of 2000% to the defined properly formed range of 0-100% and determine that the data packet is not properly formed based on the comparison. In such an example, the protocol handler 324 may reject the data packet and/or transmit an error code to a transmitter of the data packet based on determining that the data packet is not properly formed.

In the illustrated example of FIG. 3, the protocol handler 324 includes the RX/TX interface handler 328 to process communication operations between the field device MCU 350 and the BLE interface 340. In some examples, the RX/TX interface handler 328 receives a data packet from the receiver transmitter interface 300 and/or the input/output interface 310 and transmits the data packet to the BLE interface 340 via the BLE stack handler 330. For example, the RX/TX interface handler 328 may include a TX buffer to obtain a data packet designated to be transmitted to the BLE interface 340 from the field device MCU 350. In some examples, the RX/TX interface handler 328 receives a data packet from the BLE interface 340 and transmits the data packet to the field device MCU 350. For example, the RX/TX interface handler 328 may include a RX to obtain a data packet designated to be transmitted to the field device MCU 350 from the BLE interface 340. The BLE interface 340 and the field device MCU 350 of the illustrated example support UART, I2C, SPI, and/or other similar integrated circuit communication protocol.

In the illustrated example of FIG. 3, the platform manager 320 includes the power manager 326 to determine a mode of the field device 102 of FIGS. 1-2, to perform a power evaluation of an available power budget of the BLE bridge 104, and to adjust one or more parameters of the BLE interface 340 based on a power evaluation event. In some example, the power manager 326 determines the mode of the field device 102 by querying the field device MCU 350, the database 355, etc.

In some examples, the power manager 326 determines that the field device 102 is in a maintenance mode based on information from the field device MCU 350, information in the database 355. In such examples, the power manager 326 can disable one or more functions of the field device 102 such as measuring a position of the valve 118, measuring a supply pressure of the actuator 116, etc., to conserve energy. In response to disabling the one or more functions, the power manager 326 may re-allocate the energy corresponding to the disabled functions to the BLE interface 340. For example, the power manager 326 may disable one or more process control operations to give more power to the BLE bridge 104 to increase a data rate throughput.

In some examples, the power manager 326 determines that the field device 102 is in a secure mode based on information from the field device MCU 350, information in the database 355, etc. In such examples, the power manager 326 can disable write access to one or more field device parameters. For example, the power manager 326 may disable write access to a firmware version value, a serial number value, an error log file, a BLE interface parameter (e.g., a BLE connection interval, a BLE radio address, etc.), etc., stored in the field device MCU 350, the database 355, etc.

In some examples, the power manager 326 determines whether an input power, an input current, an input voltage, etc., satisfies a threshold. For example, the power manager 326 may determine an input power of the field device 102, compare the input power to one or more thresholds, and determine whether the input power satisfies the one or more thresholds based on the comparison. In such an example, the power manager 326 may identify a power evaluation event based on the input power satisfying one or more threshold. For example, the power manager 326 may compare the input power (e.g., an input current, an input voltage, etc.) to a low-power threshold (e.g., a low-current threshold, a low-voltage threshold, etc.). In such an example, the power manager 326 may compare an input current of 3.8 mA to a low-current threshold of 4 mA and determine that the input current satisfies the low-current threshold by being less than the low-current threshold. In such an example, the power manager 326 may identify a power evaluation event based on the input current satisfying the low-current threshold. In another example, the power manager 326 may compare the input power (e.g., the input current, the input voltage, etc.) to a high-power threshold (e.g., a high-current threshold, a high-voltage threshold, etc.). In such an example, the power manager 326 may compare an input current of 15.8 mA to a high-current threshold of 12.5 mA and determine that the input current satisfies the high-current threshold by being greater than the low-current threshold. In such an example, the power manager 326 may identify a power evaluation event based on the input current satisfying the high-current threshold.

In some examples, the power manager 326 calculates an input power change rate based on a rate of change of the input power as a function of time. For example, the power manager 326 may determine an input power of the device during every cycle (e.g., every control cycle, every 100 milliseconds, every 1 second, etc.) of the field device 102. In such an example, the power manager 326 may calculate a rate of change of the power input (e.g., a rate of change of 1.5 mA, 2.5 mA, etc., per control cycle), compare the rate of change of the power input to an input power change rate threshold, and determine whether the input power change rate satisfies the input power change rate threshold based on the comparison. For example, the power manager 326 may calculate an input power change rate of 3 mA per control cycle, compare the input power change rate to an input power change rate threshold of 2.5 mA per control cycle, and determine that the input power change rate satisfies the input power change rate threshold based on the input power change rate being greater than the input power change rate threshold. In such an example, the power manager 326 may identify a power evaluation event based on the input power change rate satisfying the input power change threshold.

In some examples, the power manager 326 performs a power evaluation based on a power evaluation event such as an elapsed timer, a sudden change in power of the field device 102, a change in amount of data to be transferred to the field device 102, a change in amount of data to be received from the remote device 360, etc. In some examples, the power evaluation event is a start-up of the BLE bridge 104, the field device 102, etc. In some examples, the power evaluation event is a manual trigger from a user, an external device such as the remote device 360, etc. In some examples, the power manager 326 reads a power input (e.g., a voltage, a current, etc.) of the field device 102 in response to detecting a power evaluation event.

In some examples, the power manager 326 performs a power evaluation based on an available power budget of the BLE bridge 104, a status or a parameter of the BLE interface 340, etc. In some examples, the power manager 326 performs a power evaluation including measuring a radio transmission rate of the BLE interface 340. For example, the power manager 326 may calculate a transmission rate (e.g., a current transmission rate, an instant transmission rate, etc.) of the BLE interface 340 based on a number of bytes transmitted per second (e.g., calculate a transmission rate in bytes/second).

In some examples, the power manager 326 calculates a radio energy consumption (REC) value (e.g., an REC value measured in milliwatts (mW) or millijoules (mJ) per second) based on the radio transmission rate. For example, the power manager 326 may determine an amount of energy consumed by activating, enabling, waking up, etc., the BLE interface 340. For example, the power manager 326 may determine an energy overhead value of the BLE interface 340 including the power to execute instructions or processes with the platform manager 320, the BLE stack handler 330, etc., process data from the receiver transmitter interface 300, encrypt data received from the receiver transmitter interface 300, etc.

In some examples, the power manager 326 calculates the REC value without including the activation energy of the BLE interface 340 (e.g., the activation energy is calculated separately). For example, the power manager 326 may calculate the REC based on a sum of (1) multiplying an energy overhead (EO) (e.g., an EO measured in mJ) per data packet and a first data rate including a number of data packets transmitted per second and (2) an EO per byte of data and a second data rate including a number of bytes transmitted per second. For example, the power manager 326 may calculate the REC based on Equation (1) below.

$$REC(\text{mW}) = \left(\frac{EO \text{ mJ}}{\text{data packet}}\right) * \frac{\text{data packets}}{\text{second}} + \left(\frac{EO \text{ mJ}}{\text{byte}}\right) * \frac{\text{bytes}}{\text{second}} \quad \text{Equation (1)}$$

In some examples, the power manager 326 calculates the radio energy consumption value including the activation energy of the BLE interface 340. For example, the power manager 326 may calculate the REC based on a sum of (1) multiplying an energy overhead (EO) in millijoules (mJ) per data packet and a first data rate including a number of data packets transmitted per second, (2) multiplying an EO per byte of data and a second data rate including a number of bytes transmitted per second, and (3) multiplying an amount of quiescent energy per second and an amount of time the BLE interface 340 takes to activate. For example, the power manager 326 may calculate the REC based on Equation (2) below:

$$REC(\text{mW}) = \left(\frac{EO \text{ mJ}}{\text{data packet}}\right) * \frac{\text{data packets}}{\text{second}} + \left(\frac{EO \text{ mJ}}{\text{byte}}\right) * \frac{\text{bytes}}{\text{second}} + \left(\frac{\text{quiescent energy}}{\text{second}}\right) \qquad \text{Equation (2)}$$

In some examples, the power manager 326 measures energy stored in a power supply of the BLE interface 340 via GPIO or analog-to-digital converter hardware, using a filter (e.g., a Kalman filter) based on a power input and a power output of the field device 102, etc. In some examples, the BLE interface 340 includes one or more storage capacitors on the power supply to the BLE radio to ensure continuous radio communication.

In some examples, the power manager 326 determines a size of a requested communication operation. For example, the power manager 326 may calculate a number of data packets to execute a data transmission operation or a data receiving operation. In some examples, the power manager 326 determines a data rate to support the size of the requested communication operation. For example, the power manager 326 may determine a data transmission rate to send field device information from the BLE interface 340 to the remote device 360 based on an available power budget of the BLE bridge 104, a time-based requirement to complete a communication operation, etc. In some examples, the power manager 326 calculates a maximum transmission rate based on the power evaluation (e.g., the available power budget).

In some examples, the power manager 326 directs the BLE stack handler 330 to adjust a parameter of the BLE interface 340 based on the power evaluation. For example, the power manager 326 may determine an adjustment to a parameter such as a connection interval, a radio power level (e.g., a radio transmission power level, a radio receiving power level, etc.), a payload size, a latency level (e.g., a slave latency level), etc., and/or a combination thereof and direct the BLE stack handler 330 to implement the adjustment.

In some examples, the power manager 326 adjusts a power evaluation event timer (e.g., an amount of time in between power evaluations) based on the power evaluation (e.g., the existent power budget). For example, the power manager 326 may increase the power evaluation event timer based on determining a relatively low power budget. For example, the power manager 326 may reduce a number of power evaluations within a time period to conserve power of the field device 102. In some examples, the power manager 326 calculates a power evaluation timer based on an input power to the field device 102 of FIG. 1 (e.g., input power), a stored power in an internal power storage component of the field device 102 (e.g., stored power, stored power in a capacitor, an inductor, etc.), a requested amount of power by the BLE stack handler 330 via the BLE interface 340 to transmit or receive data (e.g., output power), etc., and/or a combination thereof.

In such examples, the power manager 326 calculates an amount of time (e.g., a stored power drain time) the BLE interface 340 can drain the stored power based on a current configuration (e.g., a current transmission rate, a current transmission power, etc.). For example, the power manager 326 may calculate a power evaluation timer to be less than the stored power drain time to help ensure that the power status of the field device 102, the BLE bridge 104, etc., is evaluated prior to the BLE bridge 104 consuming enough of the available power budget to create a power starving event (e.g., an event where the field device 102, the BLE bridge 104, etc., cannot perform a function due to not enough available power). For example, the power manager 326 may adjust a power evaluation event timer based on the input power (e.g., the input power measured in millijoules), the stored power (e.g., the stored power measured in millijoules), and the output power (e.g., the output power measured in millijoules) as described below in Equation (3).

$$\text{Power Evaluation Event Timer} < \frac{\text{stored power mJ}}{\frac{\text{output power mJ}}{\text{second}} - \frac{\text{input power}}{\text{second}}} \qquad \text{Equation (3)}$$

In the illustrated example, the BLE bridge 104 includes the BLE stack handler 330 to manage the BLE interface 340. In some examples, the BLE stack handler 330 emulates a serial port connection over a Bluetooth wireless connection. For example, the BLE stack handler 330 may emulate a UART to facilitate communication between the BLE interface 340 and the platform manager 320. In some examples, the BLE stack handler 330 implements a change to a parameter of the BLE interface 340. For example, the BLE stack handler 330 may adjust a connection interval of the BLE interface 340 based on a determination of a connection interval adjustment by the power manager 326.

In the illustrated example, the BLE bridge 104 includes the database 355 to record data (e.g., the mode of the field device 102, the protocol address, a parameter of the BLE stack handler 330, a parameter of the BLE interface 340, etc.). The example database 355 may respond to queries for information related to data in the database 355. For example, the database 355 may respond to queries for additional data by providing the additional data (e.g., the one or more data points), by providing an index associated with the additional data in the database 355, etc. The example database 355 may additionally or alternatively respond to queries when there is no additional data in the database 355 by providing a null index, an end of database identifier, etc.

The example database 355 may be implemented by a volatile memory (e.g., a Synchronous Dynamic Random Access Memory (SDRAM), Dynamic Random Access Memory (DRAM), RAMBUS Dynamic Random Access Memory (RDRAM), etc.) and/or a non-volatile memory (e.g., flash memory). The example database 355 may additionally or alternatively be implemented by one or more double data rate (DDR) memories, such as DDR, DDR2, DDR3, DDR4, mobile DDR (mDDR), etc. The example database 355 may additionally or alternatively be implemented by one or more mass storage devices such as hard disk drive(s), compact disk drive(s) digital versatile disk drive(s), solid-state drive(s), etc. While in the illustrated example the database 355 is illustrated as a single database, the database 355 may be implemented by any number and/or type(s) of databases.

In the illustrated example, the BLE bridge 104 includes the BLE interface 340 to transmit information to and/or receive information from an external device such as the remote device 360. The BLE interface 340 of the illustrated example is a radio transceiver operating in the 2.4 GHz unlicensed ISM band. For example, the BLE interface 340 may operate the radio transceiver based on a connection interval, a radio power level, a latency, etc., defined by the power manager 326 and/or implemented by the BLE stack handler 330.

While an example manner of implementing the BLE bridge 104 of FIGS. 1-2 is illustrated in FIG. 3, one or more of the elements, processes and/or devices illustrated in FIG. 3 may be combined, divided, re-arranged, omitted, eliminated and/or implemented in any other way. Further, the example receiver transmitter interface 300, the example input/output interface 310, the example platform manager 320, the example command processor 322, the example protocol handler 324, the example power manager 326, the example RX/TX interface handler 328, the example BLE stack handler 330, the example database 335, the example BLE interface 340, and/or, more generally, the example BLE bridge 104 of FIGS. 1-2 may be implemented by hardware, software, firmware and/or any combination of hardware, software and/or firmware. Thus, for example, any of the example receiver transmitter interface 300, the example input/output interface 310, the example platform manager 320, the example command processor 322, the example protocol handler 324, the example power manager 326, the RX/TX interface handler 328, the example BLE stack handler 330, the example database 335, the example BLE interface 340, and/or, more generally, the example BLE bridge 104 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)). When reading any of the apparatus or system claims of this patent to cover a purely software and/or firmware implementation, at least one of the example receiver transmitter interface 300, the example input/output interface 310, the example platform manager 320, the example command processor 322, the example protocol handler 324, the example power manager 326, the RX/TX interface handler 328, the example BLE stack handler 330, the example database 335, and/or the example BLE interface 340 is/are hereby expressly defined to include a non-transitory computer readable storage device or storage disk such as a memory, a digital versatile disk (DVD), a compact disk (CD), a Blu-ray disk, etc., including the software and/or firmware. Further still, the example BLE bridge 104 of FIGS. 1-2 may include one or more elements, processes and/or devices in addition to, or instead of, those illustrated in FIG. 3, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 4:
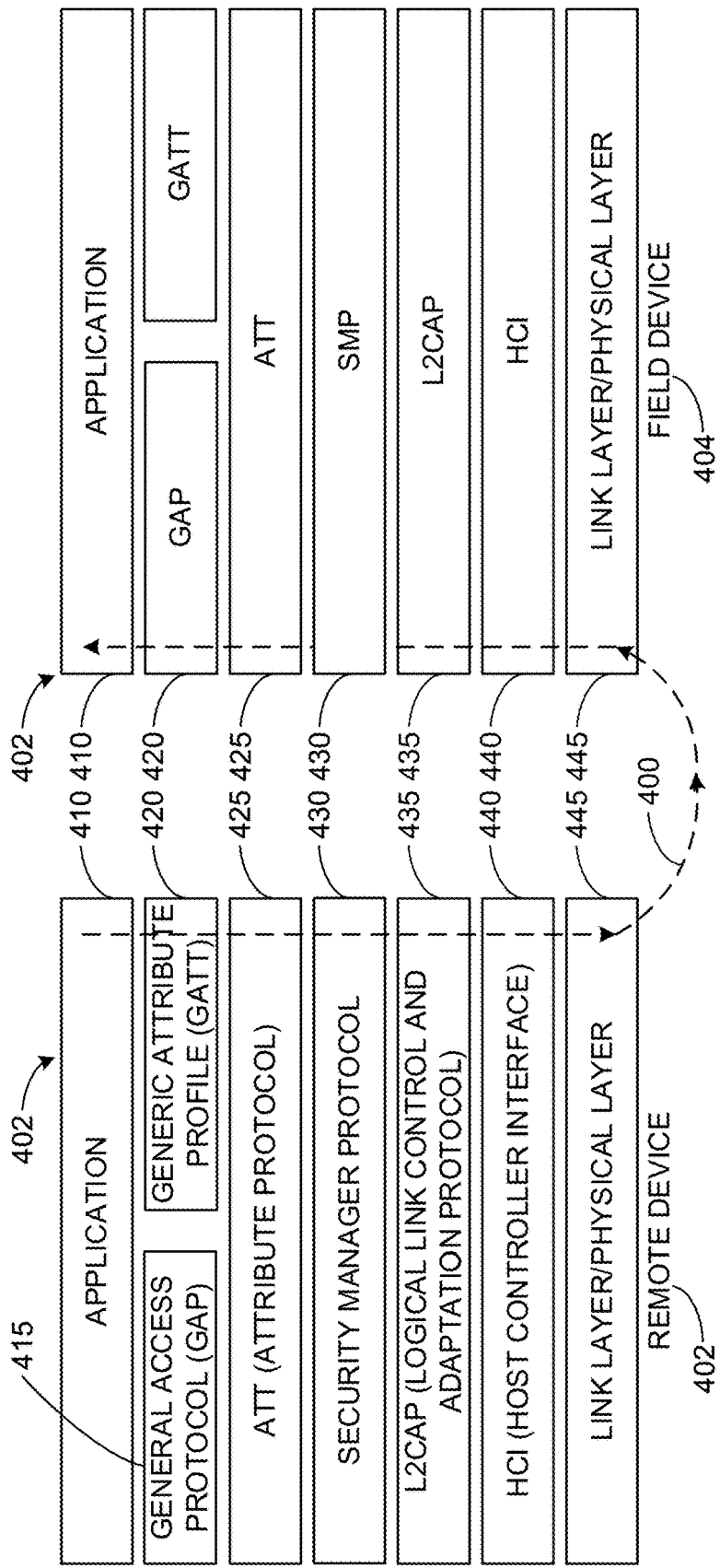
FIG. 4 is a block diagram of an example BLE communication path between a remote device and a field device.

FIG. 4 is a block diagram of an example BLE communication path 400 between an example BLE protocol stack 402 of a remote device 404 and the BLE protocol stack 402 of a field device 406. The BLE protocol stack 402 of the illustrated example is based on the Bluetooth Core Specification (e.g., the Bluetooth Core Specification Version 5.0). One or more of the elements, processes and/or blocks illustrated in FIG. 4 may be combined, divided, re-arranged, omitted, eliminated and/or implemented in any other way. The remote device 404 of the illustrated example of FIG. 4 may correspond to the remote device 106 of FIG. 1, the Remote Devices 1-3 200, 202, 204 of FIG. 2, and/or the remote device 360 of FIG. 3. The field device 406 of the illustrated example of FIG. 4 may correspond to the field device 102 of FIGS. 1-2 and/or the field device MCU 350 of FIG. 3. The example BLE protocol stack 402 may be executed with the example BLE stack handler 330 of FIG. 3. In the illustrated example, the link layer/physical layer 445 of the remote device 404 is communicatively coupled to the link layer/physical layer 445 of the field device 406.

In the illustrated example, the BLE protocol stack 402 includes an example application layer 410, an example general access protocol (GAP) layer 415, an example generic attribute profile (GATT) layer 420, an example attribute protocol (ATT) layer 425, an example security manager protocol 430, an example logical link control and adaptation protocol (L2CAP) layer 435, an example host controller interface layer 440, and an example link layer/physical layer 445.

In the illustrated example of FIG. 4, the BLE protocol stack 402 includes the application layer 410 to obtain and process application data. For example, the application layer 410 of the remote device 404 may include an interface to a process control application operating on a standard operating system. In another example, the application layer 410 of the field device 406 may include an interface to an application (e.g., a firmware application, a firmware application executing instructions with a processor, etc.) on the field device MCU 350 of FIG. 3.

In the illustrated example of FIG. 4, the BLE protocol stack 402 includes the GAP layer 415 to define a general topology of the BLE protocol stack 402. For example, the GAP layer 415 defines how the remote device 404 and the field device 406 make themselves available (e.g., broadcasting) and how the remote device 404 and the field device 406 communicate with each other (e.g., connecting). For example, the GAP layer 415 defines the roles of a BLE broadcaster and a BLE observer. For example, a BLE broadcaster may be a device that broadcasts public advertising data packets and a BLE observer may be a device that listens to the data in the advertising packets sent by the broadcaster.

In the illustrated example of FIG. 4, the BLE protocol stack 402 includes the GATT layer 420 to define the roles of a BLE client (e.g., the remote device 106 of FIG. 1) and a BLE server (e.g., the field device 102 of FIGS. 1-4. For example, a BLE client may be a device that sends a request to a GATT server, where the BLE client can read and/or write attributes found in the server. A BLE server may be a device that stores attributes. For example, once the BLE client makes a request, the server must make the attributes available.

In the illustrated example of FIG. 4, the BLE protocol stack 402 includes the ATT layer 425 to define the protocol of transferring the attribute data between the remote device 404 and the field device 406. The example ATT layer 425 includes functionality of the example GATT layer 420 such as Write Request, Write Response, Notification, Read Response, etc. For example, the GATT layer 420 defines and creates appropriate attributes for a given application in the application layer 410 and the ATT layer 425 creates outgoing data packets and parses incoming data packets that defines the action in the GATT layer 420.

In the illustrated example of FIG. 4, the BLE protocol stack 402 includes the security manager protocol 430 to process attribute permission levels such as read permissions, write permissions, etc. In some examples, the security manager protocol 430 performs services such as device authentication, device authorization, data integrity, data confidentiality, and/or data privacy. In some examples, the security manager protocol 430 compares a permission level of a user (e.g., an administrator, an engineer, a user, etc.) to a permission level of an action requested by the user (e.g., a read request, a write request, etc.). In such examples, the security manager protocol 430 prevents a user from performing an action if the permission levels do not match. For example, the security manager protocol 430 may discard a data packet corresponding to the unauthorized action and may transmit an error code to the user indicating that the action is unauthorized.

In the illustrated example of FIG. 4, the protocol stack 402 includes the L2CAP layer 435 to manage Quality of Service (QoS), routing, fragmentation, and reassembly of data packets for higher layer protocols such as ATT, Security Management Protocol (SMP), etc. In the illustrated example of FIG. 4, the protocol stack 402 includes the HCI layer 440 to interface with the BLE interface 340 of FIG. 3. For example, the HCI layer 440 may transfer BLE commands, BLE events, BLE data packets, etc., between layers of the BLE protocol stack 402. In the illustrated example of FIG. 4, the BLE protocol stack 402 includes the link layer/physical layer 445 to control, handle, manage, etc., a transfer of L2CAP packets while ensuring delivery (e.g., guaranteed deliver) and integrity of the data.

Figure 5:
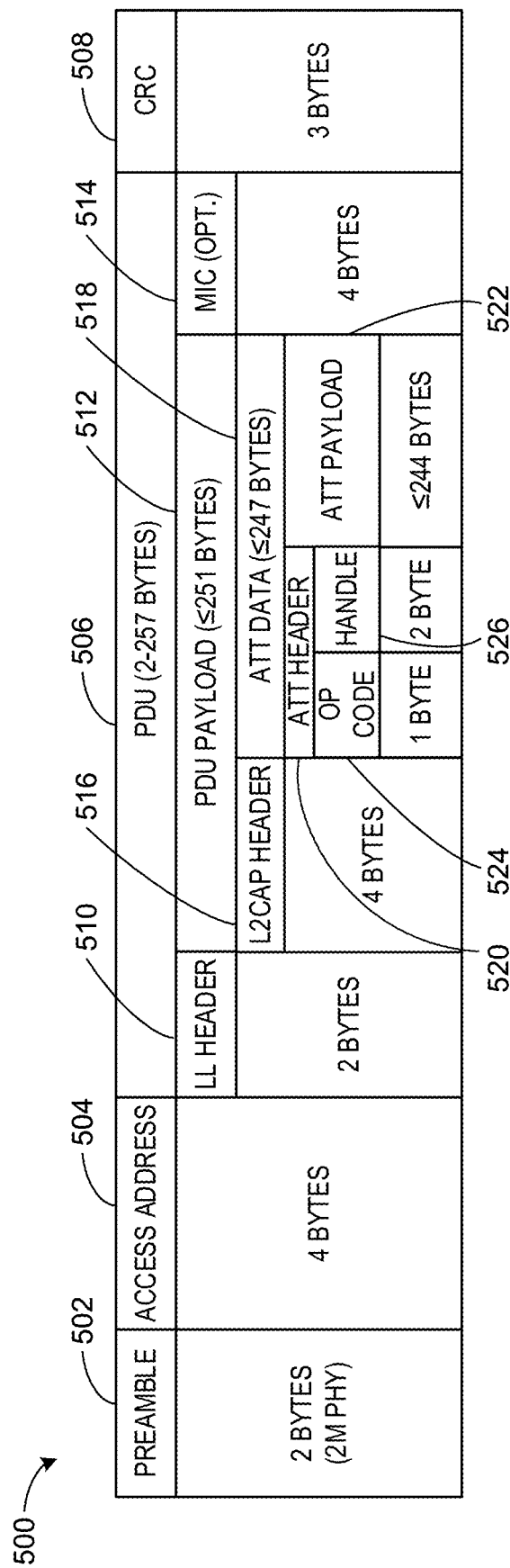
FIG. 5 is a block diagram of an example implementation of an Attribute Protocol packet.

FIG. 5 is a block diagram of an example implementation of an ATT protocol packet 580. In the illustrated example, the ATT protocol packet 500 includes a preamble 502, an access address, 504, a protocol data unit (PDU) 506, and a cyclic redundancy check (CRC) 508. The preamble 502 of the illustrated example is a 2-byte value used for synchronization and timing of the receiver of data (e.g., the remote device 404, the field device 406, etc.). For example, a preamble value of 0xAA in a BLE packet may indicate that the BLE packet is a broadcast packet. The access address 504 of the illustrated example is a 4-byte value identifying a BLE device. For example, an access address value of a BLE packet of 0x8E89BED6 may indicate that the BLE packet may indicate that the BLE packet is a broadcast packet.

In the illustrated example of FIG. 5, the example PDU 506 can be a value in a range from 2 to 257 bytes. For example, the power manager 326 of FIG. 3 may determine a size of the PDU 506 based on an available power budget of the BLE bridge 104 of FIG. 3. The example PDU 506 includes a link layer (LL) header 510 which is a 2-byte value which identifies the example link layer/physical layer 445 of FIG. 4. The example PDU 506 includes an example PDU payload 512 which is a value within a range of 0 to 251 bytes. The example PDU 506 includes an example message integrity check (MIC) 514 which is a 4-byte value used to evaluate a data integrity of a BLE packet. The example PDU payload 512 includes an example L2CAP header 516 which is a 4-byte value identifying the example L2CAP layer 435 of FIG. 4.

The example PDU payload 512 of the illustrated example of FIG. 5 includes example ATT data 518 which is a value in a range of 0 to 247 bytes. The example ATT data 518 includes an example ATT header 520 and an example ATT payload 522. The example ATT header 520 is a 3-byte value organized by an example opcode 524 and an example handle 526. The example opcode 524 is a 1-byte value that may correspond to an instruction or an operation to be executed. The example handle 526 is a 2-byte value which corresponds to an attribute on a GATT server on the example GATT layer 420 of FIG. 4. The example ATT payload 522 is a value within a range of 0 bytes to 244 bytes corresponding to data (e.g., field device information, a firmware executable, etc.) to be transmitted to the remote device 404, the field device 406, etc.

In the illustrated example of FIG. 5, there are several elements of the ATT protocol packet 500 that may be adjusted or removed based on an available power budget. For example, the protocol handler 324 may remove the LL header 510, the L2CAP header 516, the MIC 514, etc., prior to transmitting a data packet to the remote device 360 of FIG. 3. In another example, the power manager 326 may increase or decrease the size of the PDU 506 based on an available power budget and/or adjusting a maximum transmission unit (MTU) parameter. For example, the power manager 326 may increase the size of the PDU 506 from 100 bytes to 257 bytes based on an increase in an available power budget of the BLE bridge 104 and/or an increase in the MTU. In another example, the power manager 326 may decrease the size of the PDU 506 from 257 bytes to 10 bytes based on a decrease in an available power budget of the BLE bridge 104 and/or a decrease in the MTU.

FIG. 6A is an example block diagram depicting an example implementation of an example BLE advertising data format 600. The BLE advertising data format 600 of the illustrated example is a known legacy BLE PDU format (e.g., based on the Bluetooth Core Specification Version 5.0). The example BLE advertising data format 600 describes a format used by a device to generate a BLE packet used for advertising information in a BLE network. The example BLE advertising data format 600 includes data structures AD Data 0 602, AD Data 1 604, AD Data 2 606, where each one of the data structures includes a length parameter 608a, an AD type parameter 608b, and an AD Data parameter 608c. For example, the length parameter may correspond to a length (e.g., a number of bits, a number of bytes, etc.) of the AD Data. The AD Type parameter may correspond to a data type of the AD Data such as a Boolean, an integer, a float, etc.

FIG. 6B is an example block diagram depicting an example implementation of another example BLE advertising data format 610. The example BLE advertising data format 610 describes a format used by a device to generate a BLE packet used for advertising information in a BLE network. For example, the field device 102 of FIG. 1 may generate an advertising packet based on the BLE advertising data format 610 and transmit the advertising packet to a device (e.g., the remote device 106 of FIG. 1) via the BLE network 108 of FIG. 1. The BLE advertising data format 610 of the illustrated example includes data structures AD Data 0 620 and AD Data 1 630. In the illustrated example, the data structure AD Data 0 620 corresponds a shortened local name of a device and the data structure AD Data 1 630 corresponds to manufacturer specific data. For example, the shortened local name of a device may be a name used to identify a field device (e.g., a P&ID tag). The example data structure AD Data 0 620 may include the shortened local name because a remote device may not list a BLE device without the data structure AD Data 0 620. The example data structure AD Data 1 630 includes a manufacturer specific advertising and scan response data (ADSR). ADSR data includes an identifier and additional data. In some examples, identifiers and the additional data can be concatenated up to a maximum allowable length of the advertising PDU. In some examples, the ADSR fields can be removed.

The example data structure AD Data 0 620 of FIG. 6B includes a first length field 622 represented by "Q+1," where Q represents an adjustable length of the data structure AD Data 0 620. In the illustrated example, the BLE advertising data format 610 supports both extended and legacy-based advertising formats. For example, for extended advertising format, the maximum length Q is 248 bytes and for legacy advertising format, the maximum length Q is 29 bytes.

The example data structure AD Data 0 620 of the illustrated example includes a first AD Type field 624 including a hex representation of a byte value of 0x08. The byte value 0x08 of the illustrated example may indicate that the data structure AD Data 0 620 includes data corresponding to a shortened local name of a device as described in FIG. 6C. The example data structure AD Data 0 620 includes a first AD Data field 626 representing a UTF-8 shortened local name string with length Q. In the illustrated example, the data structure AD Data 0 620 may not need a null terminator. In some examples, when the first AD Data field 626 includes a string, a first character of the string is placed in byte 0.

In the illustrated example of FIG. 6B, the data structure AD Data 1 630 is an extendible, flexible structure for advertising and scan response data. In some examples, the data structure AD Data 1 630 can be structured as required by an operator of the field device 102. For example, an operator in the process control industry can eliminate the data structure AD Data 1 630 to implement data privacy (e.g., limit information that is to be broadcasted in a BLE network) or structure the data structure AD Data 1 630 based on requirements of the operator. In such an example, the operator is free to define an order of data, a length of the data up to a maximum PDU size, a number of elements in the data, information included in the data, etc. In some examples, the data structure AD Data 1 630 can be dynamic. For example, the data structure AD Data 1 630 may be adjustable between data packet transmissions. In some examples, the data structure AD Data 1 630 can be encrypted. For example, the data structure AD Data 1 630 may only be decoded if a receiving device has an appropriate decryption key. In some examples, the data structure AD Data 1 630 can work with legacy advertising and scan response formats (e.g., the example BLE advertising data format 600 of FIG. 6A) and extended advertising and scan response formats.

The data structure AD Data 1 630 of the illustrated example includes a second length field 632 represented by "P+3", where P represents an adjustable length of the data structure AD Data 1 630. The example data structure AD Data 1 630 of the illustrated example includes a second AD Type field 634 including a hex representation of a byte value of 0xFF. The byte value of 0xFF of the illustrated example may indicate that the data structure AD Data 1 630 includes data corresponding to manufacturer specific data as described in FIG. 6C.

The data structure AD Data 1 630 of the illustrated example includes a second AD Data field 636. The second example AD Data field 636 includes an example Company ID LSB 638, an example Company ID MSB 640, and example ADSR data fields 642 (e.g., ADSR 0, ADSR 1, ADSR P−1, etc.) which are further described in FIG. 6C. In the illustrated example, the ADSR data fields 642 are concatenated with a total length of P. In some examples, for extended advertising, the maximum length of P is 246-Q. In some examples, for legacy advertising, the maximum length is 26-Q. In some examples, aside from a data type and a data length, the information included in the second AD Data field 636 can be defined by a manufacturer or an operator. For example, the ADSR data fields 642 may be adjusted from a first operator of the field device 102 to a second operator of another field device due to privacy concerns. For example, the first operator may define the ADSR data fields 642 to include a privacy bit to encrypt the ADSR data fields 642. In such an example, the BLE bridge 104 may broadcast the ADSR data fields 624 but only devices with a corresponding decryption key can decode the encrypted ADSR data fields 624. In another example, the first operator may include more ADSR data fields than the second operator.

FIG. 6C is an example table 650 depicting an example structure of the example BLE advertising data format 610 of FIG. 6B. The example table 650 includes a description, an advertising data (ADVDATA) index, and corresponding values and notes for fields in the example data structures AD Data 0 620 and AD Data 1 630.

FIG. 7A is an example block diagram depicting an example implementation of an example BLE scan response data format 700. The example BLE scan response data format 700 describes a format used by a device to generate a BLE packet in response to receiving an advertising packet. For example, the remote device 106 of FIG. 1 may generate a scan response packet based on the BLE scan response data format 700 in response to receiving an advertising packet (e.g., a packet based on the BLE advertising data format 610 of FIG. 6B) from the field device 102. In such an example, the remote device 106 may transmit the scan response packet to the field device 102 via the BLE network 108 of FIG. 1. In the illustrated example, ADSR data is concatenated with a total length of R. In some examples, the BLE scan response data format supports both extended advertising and legacy advertising. For example, for extended advertising, the maximum length of R is 247 bytes. In another example, for legacy advertising, the maximum length is 27 bytes.

FIG. 7B is an example table 710 depicting an example structure of the example BLE scan response data format 700 of FIG. 7A. The example table 710 includes a description, an advertising data (ADVDATA) index, and corresponding values and notes for fields in the example data structures in the BLE scan response data format 700 of FIG. 7A.

FIG. 8 is an example table 800 depicting example advertising and scan response data corresponding to the example BLE advertising data format 610 of FIG. 6B and the example BLE scan response data format 700 of FIG. 7A. In the illustrated example, the table 800 includes identifiers that can be used to identify a supported protocol of a device, a protocol to be used when processing a data packet, etc., such as HART 5, HART 6, HART 7, etc.

In some examples, to minimize a size of the advertising PDU, ADSR data lengths are implied. For example, an implied length corresponds to transmitting a data packet without information corresponding to a length of a parameter in a data payload of the data packet. In such an example, the implied lengths are pre-defined on the field device 102, the remote device 106, etc., so that the lengths of the parameters do not need to be transmitted for every communication operation as they are implied based on the identifier. For example, a typical packet transmission includes an identifier, a length, and data corresponding to a parameter within a data payload. By using implied lengths, the length information is not transmitted. For example, as illustrated in table 800, receiving a first identifier of 0x00 indicates that the next data point is another identifier and not data associated with the first identifier. In another example, as illustrated in table 800, receiving a second identifier of 0x08 implies that the next 6 bytes are data. Using an implied length reduces power by not sending data corresponding to the length of the parameter and allows more payload data to be transmitted in place of the length. In such examples, using implied data lengths provides flexibility when configuring broadcast information that may be useful for a field device, an end user, etc.

In the illustrated example of FIG. 8, the table 800 includes data values that can be used to represent device information, common variables (e.g., a current value, a set point, a valve position, etc.). The example table 800 further includes data values that can be used to represent valve specific parameters, transmitter specific parameters, alerts, protocol specific parameters, etc. Additionally or alternatively, there may be fewer or more than the protocols, device information, common, valve specific, transmitter specific, alerts, and protocol specific categories than depicted in the example table 800. Additionally or alternatively, there may be fewer or more than the depicted elements in each category (e.g., there may be more than 4 or fewer than 4 elements of the common category) as depicted in the example table 800.

Figure 9:
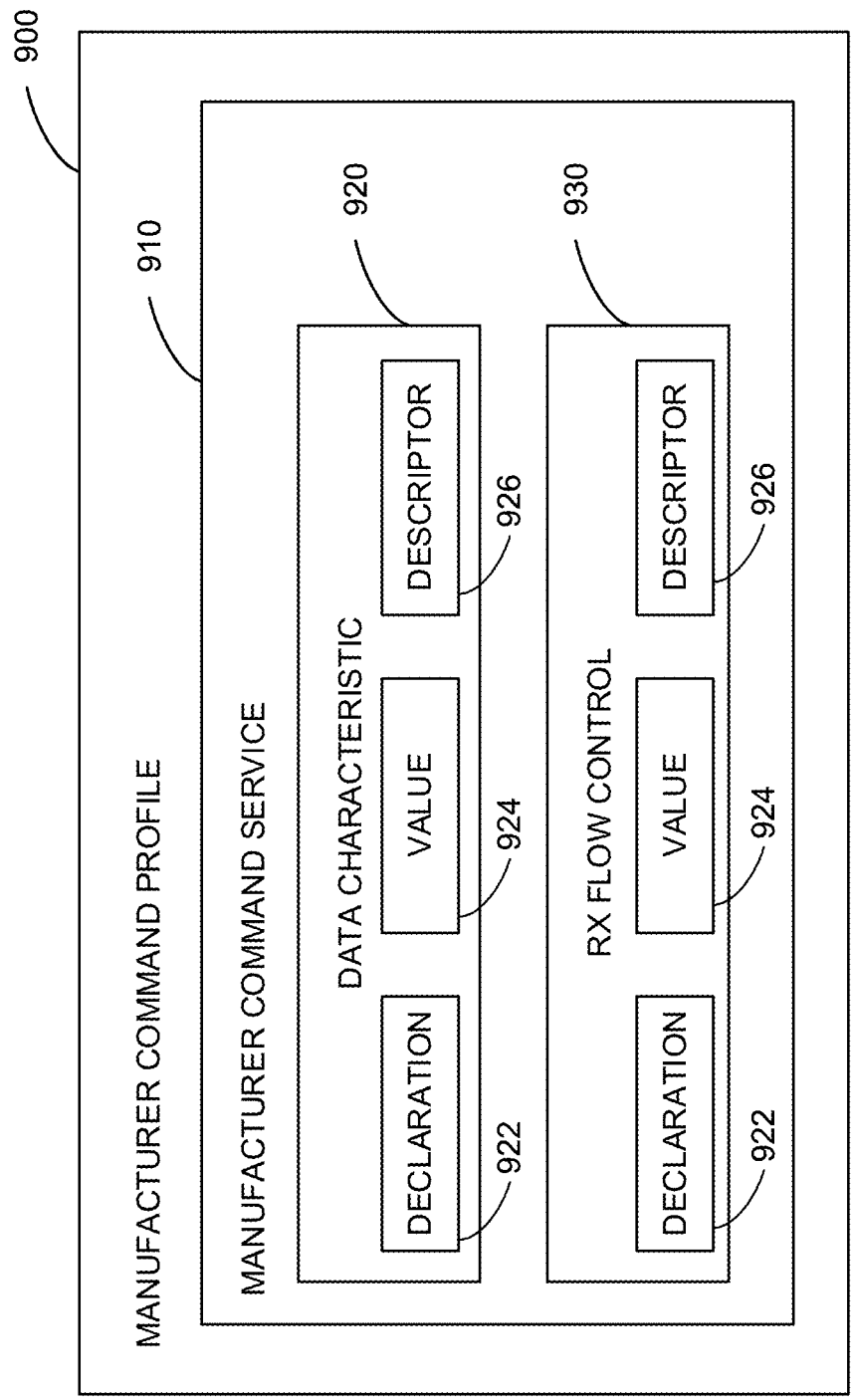
FIG. 9 is a block diagram of an example implementation of an example manufacturer command profile and an example manufacturer command service.

FIG. 9 is a block diagram of an example implementation of an example manufacturer command profile 900 and an example manufacturer command service 910. The example manufacturer command profile 900 represents a base functionality including modes and access procedures used by protocol layers such as the GATT layer 420 and the ATT layer 425 of FIG. 4. For example, the manufacturer command profile 900 may process a command described below in connection with FIG. 12B. For example, the manufacturer command profile 900 may include a pre-defined collection of services such as the example manufacturer command service 910. The example manufacturer command service 910 represents functionality to perform commands using the BLE protocol. BLE is organized around reading and writing parameters or characteristics. For example, the manufacturer command profile 900 and the manufacturer command service 910 includes groupings of parameters. In some examples, the manufacturer command service 910 limits access to information or external changes (e.g., write requests to the field device 102 from the remote device 106 of FIG. 1) by declaring values read-only or read-write. For example, the field device 102 may implement a security feature which limits read-write capabilities while the field device 102 is in a secure mode of operation.

The example manufacturer command service 910 of the illustrated example includes an example data characteristic structure 920. Although only the example data characteristic structure 920 is depicted in FIG. 9, more than one data characteristics structure may be used. The example data characteristic structure 920 uses an opcode and a payload to support industrial communication protocols such as HART, FOUNDATION Fieldbus, etc., over a BLE network. Additionally or alternatively, the data characteristic structure 920 may include ancillary commands such as password challenges, device information queries, etc. In some examples, the maximum data characteristic size is 244 bytes which is calculated using a PDU size of 251 bytes less 4 bytes for an L2CAP header and less 3 bytes for a notification message header.

In the illustrated example of FIG. 9, the data characteristic structure 920 includes an example declaration structure 922, an example value structure 924, and an example descriptor structure 926. The example declaration structure 922 of the illustrated example includes data about the characteristic (e.g., a universally unique identifier (UUID). The example value structure 924 of the illustrated example is a value of the characteristic including data of interest to be transmitted between devices (e.g., firmware data, a pressure value of the field device 102, a calibration version value of the field device 102, etc.). The example descriptor structure 926 of the illustrated example is used to control behavior of and/or to provide additional information corresponding to the data characteristic structure 920. For example, the descriptor structure 926 may be used when disabling or enabling notifications.

In the illustrated example of FIG. 9, the manufacturer command service 910 includes an example receive (RX) flow control structure 930. Although only the example RX flow control structure 930 is depicted in FIG. 9, more than one RX flow control structure may be used. The example RX flow control structure includes the example declaration structure 922, the example value structure 924, and the example descriptor structure 926. Although the example descriptor structure 926 is shown in the example data characteristic structure 920 and the RX flow control structure 930, alternatively, the descriptor structure 926 may be removed from one or both of the example data characteristic structure 920 and the RX flow control structure 930.

In some examples, the RX flow control structure 930 is used to facilitate communication of large data exchanges (e.g., 100 kilobytes, 400 kilobytes, etc.). An example instance of a large data exchange is for downloading firmware information from the remote device 106 of FIG. 1 to the field device 102 of FIG. 1. For example, the RX flow control structure 930 includes notification commands to start or stop data transfers. For example, the field device 102 of FIG. 1 may use the RX flow control structure 930 to generate a data packet and transmit the data packet to the remote device 106 of FIG. 1 to start a data transfer to the field device 102.

In some examples, a command from a remote device to a field device is sent to the data characteristic structure 920 using a write with a response or a write without a response. In such examples, the field device responds to the remote device using a notification. For example, writing to the field device with a response is slower and consumes more of an available power budget than writing without a response. In some examples, writing to the field device with a response can be used to assess, determine, etc., whether a BLE connection (e.g., the BLE network 108 of FIG. 1) is still active (e.g., a user operating the remote device 106 of FIG. 1 did not walk out of range of the BLE bridge 104 of FIG. 1).

In some examples, the remote device determines if the BLE connection is still active. For example, to conserve power in the field device 102 of FIG. 1, the remote device 106 may determine when to query the field device 102 with a write with a response command. In such an example, the remote device 106 may generate a BLE packet and set an ATT payload to 0 bytes (e.g., the ATT payload 522 of FIG. 5) and transmit the BLE packet to the field device 102. The example remote device 106 may determine that the BLE network 108 is active based on receiving a response BLE packet from the field device 102. In some examples, writes with responses and writes without responses are intermixed to conserve energy of a field device. For example, for a large data transfer such as a firmware download to the field device 102, the remote device 106 may transmit first commands including writes with responses and intermix the first commands with second commands including writes without responses. For example, the remote device 106 may transmit one of the first commands for every 10 of the second commands to increase a data rate of the firmware download and to reduce an amount of energy used in executing the firmware download.

FIG. 10 is an example table 1000 depicting example command service data attributes corresponding to the example data characteristic structure 920 of FIG. 9. The example table 1000 is a standard GATT format defined by the Bluetooth Special Interest Group. In the illustrated example, the table 1000 includes the declaration structure 922, the value structure 924, and the descriptor structure 926 of FIG. 9. In some examples, the declaration structure 922 and the value structure 924 are mandatory while the descriptor structure 926 is optional.

In the illustrated example, the declaration structure 922 defines the properties for the value structure 924. The declaration structure 922 of the illustrated example includes a type field, a permissions field, and a properties field. For example, the declaration structure 922 of the data characteristic structure 920 of FIG. 9 may define the value structure 924 to be a read-only permission with no response action based on the information included in the bytes corresponding to the permissions and the properties fields. In the illustrated example, the value of the type field for the declaration structure 922 is 0x2803 (e.g., the first index [0] value of 0x03 and the second index [1] value of 0x28 are combined to form 0x2803). In such an example, the value of 0x2803 is in little endian format and corresponds to a Characteristic Declaration with a defined format. Alternatively, the example value may be 0x2802 corresponding to an Include Declaration, a 0x2800 corresponding to a Primary Service Declaration, or a 0x2801 corresponding to a Secondary Service Declaration.

In the illustrated example, the value structure 924 includes a type field, a permissions field, and a data field. For example, the remote device 106 may generate a data packet to be written to the field device 102 by including the GATT_AUTHOR_WRITE permission in the value structure 924 of the data packet. In such an example, the remote device 106 may write data included in the data field to the field device 102. In the illustrated example, the descriptor structure 926 includes a type field, a permissions field, and a data field. For example, the remote device 106 may disable notifications on the field device 102 by including the GATT_PERMIT_AUTHOR_WRITE permission and including a value of 0x0000 (e.g., a value corresponding to disabling notifications) in a data packet and transmitting the data packet to the field device 102.

FIG. 11 is an example table 1100 depicting example receive flow control data attributes corresponding to the example RX flow control structure 930 of FIG. 9. In the illustrated example, the table 1100 includes the declaration structure 922, the value structure 924, and the descriptor structure 926 of FIG. 9. In the illustrated example, the declaration structure 922 includes a type field, a permissions field, and a properties field. For example, the declaration structure 922 of the RX flow control structure 930 of FIG. 9 may include a 16-bit UUID with a read-only permission and a write with no response action. In such an example, the remote device 106 of FIG. 1 may generate a read-only data packet for the field device 102 of FIG. 1. The example field device 102 may read the data packet and in response to receiving and/or reading the data packet and not generate a response packet to the remote device 106.

In the illustrated example, the value structure 924 includes a type field, a permissions field, and a data field. For example, the remote device 106 may generate a data packet to be read by the field device 102 by including the GATT_AUTHOR_READ permission in the value structure 924 of the data packet. In such an example, the remote device 106 may include a data value of 0x00 included in the data field of the data packet to the field device 102 corresponding to the remote device 106 cannot send data. In the illustrated example, the descriptor structure 926 includes a type field, a permissions field, and a data field. For example, the remote device 106 may disable notifications on the field device 102 by including the GATT_PERMIT_AUTHOR_WRITE permission and including a value of 0x0000 (e.g., a value corresponding to disabling notifications) in a data packet and transmitting the data packet to the field device 102.

FIG. 12A is an example table 1200 depicting example command protocol Application Program Interface (API) command data. The example table 1200 includes a byte index field, a fields field, and a description field. The byte index field of the example table 1200 represents a byte index of the declaration structure 922. For example, the byte index [0] may correspond to the opcode field while the byte indices [1]-[1+N−1] represent a data payload.

FIG. 12B is an example table 1210 depicting example command protocol API command data. The example manufacturer command profile 900 may utilize the commands listed in the example 1210. The example table 1210 includes a description field, a permission field, an opcode field. The example table 1210 maps a value of an opcode to example permission settings including an administrator (ADMIN), and engineer, and a user. For example, the opcode 0x02 maps to the SYSTEM_GET_FIRMWARE_VERSION command and may be executed only by administrator level access. In some examples, by mapping available commands to permission settings, security checks and protocols can be implemented to ensure safe and reliable operation of the field device 102 of FIG. 1. In the illustrated example, the table 800 includes radio-specific commands such as SYSTEM_PING, SYSTEM_REBOOT, SYSTEM_GET_FIRMWARE_VERSION, SYSTEM_TX_POWER, and SYSTEM_GET_UART_PARAMETERS. For example, the radio-specific commands may not be sent to the field device MCU 350 of FIG. 3 and instead processed by the BLE stack handler 330 of FIG. 3. In some examples, the FIELD_DEVICE_GET_INFO command is utilized when device information (e.g., a device type, a protocol type, etc.) is not advertised. Additionally or alternatively, there may be fewer or more than the number of commands depicted in the example table 1210.

FIG. 12C is an example table 1220 depicting an example format of an example API command and an example API response. The example API command of the illustrated example is SYSTEM_PING. The example table 1220 includes a type field, a length field, and a payload field. The example type field includes a command (CMD) action and a response (RSP) action. For example, a command action has a byte length of 0x00 and a response action has a byte length of 0x06. In the example table 1220, the payload field includes an opcode field, a byte index field, and a value field. For example, the SYSTEM_PING_API command includes an opcode value of 0x00, where byte indices [0-3] correspond to a unit32 value corresponding to seconds since last reboot and byte indices [4-5] correspond to a unit16 value corresponding to fractions of a second (e.g., 1/32768 of a second fraction) since last reboot. For example, the remote device 106 may send a RSP type SYSTEM_PING command to the field device 102. In such an example, the field device 102 may transmit a data packet response to the remote device 106 including a time value corresponding to the seconds and the fractions of a second since the last reboot of the field device 102.

Flowcharts representative of example hardware logic, machine readable instructions, hardware implemented state machines, and/or any combination thereof for implementing the BLE bridge 104 of FIGS. 1-4 are shown in FIGS. 13-17. The machine readable instructions may be an executable program or portion of an executable program for execution by a computer processor such as the processor 2012 shown in the example processor platform 2000 discussed below in connection with FIG. 20. The program may be embodied in software stored on a non-transitory computer readable storage medium such as a CD-ROM, a floppy disk, a hard drive, a DVD, a Blu-ray disk, or a memory associated with the processor 2012, but the entire program and/or parts thereof could alternatively be executed by a device other than the processor 2012 and/or embodied in firmware or dedicated hardware. Further, although the example program is described with reference to the flowcharts illustrated in FIGS. 13-17, many other methods of implementing the example BLE bridge 104 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, a Field Programmable Gate Array (FPGA), an Application Specific Integrated circuit (ASIC), a comparator, an operational-amplifier (op-amp), a logic circuit, etc.) structured to perform the corresponding operation without executing software or firmware.

As mentioned above, the example processes of FIGS. 13-17 may be implemented using executable instructions (e.g., computer and/or machine readable instructions) stored on a non-transitory computer and/or machine readable medium such as a hard disk drive, a flash memory, a read-only memory, a CD, a DVD, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

Figure 13:
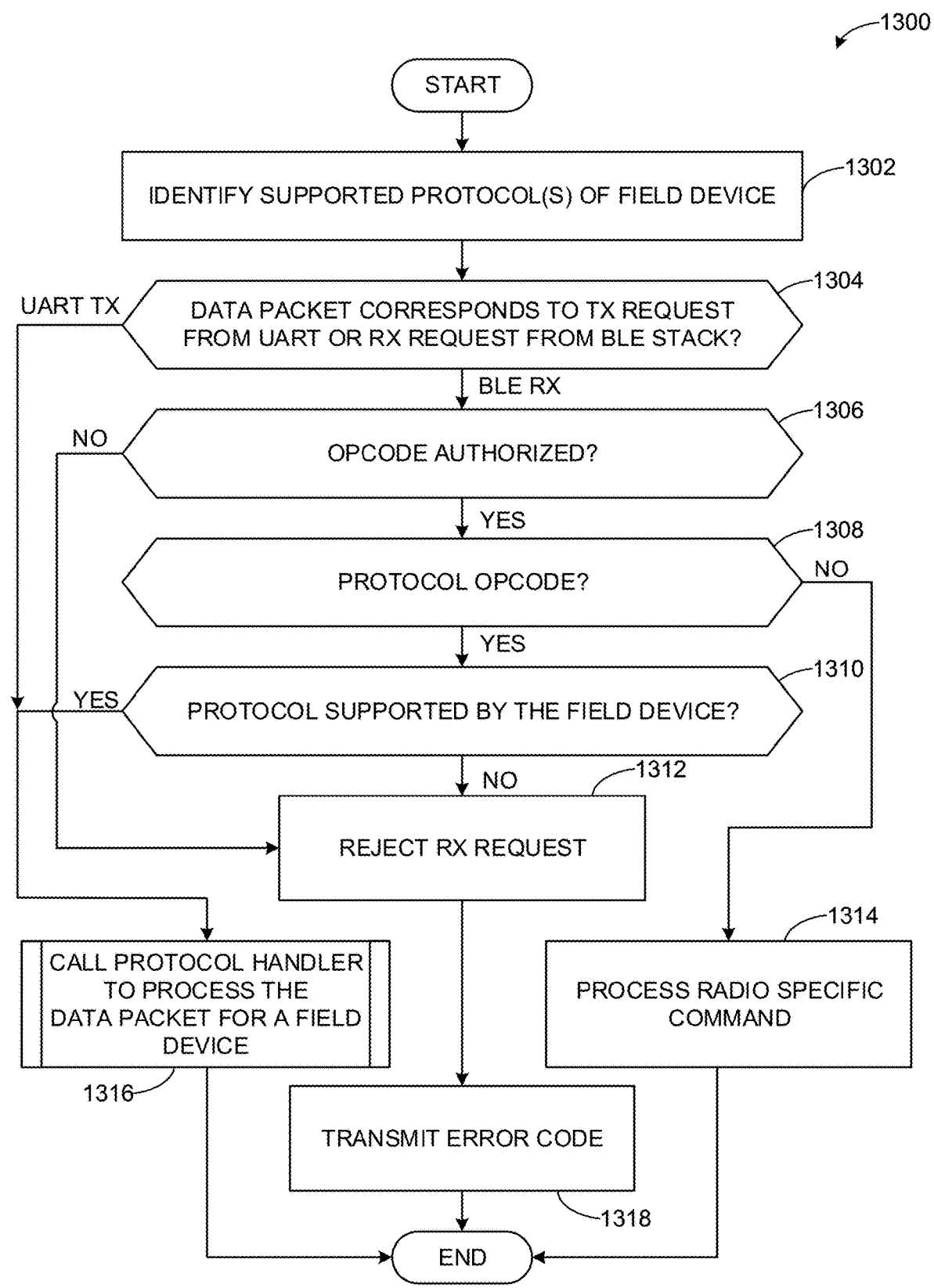
FIGS. 13-17 are flowcharts representative of example methods that may be performed using the example BLE bridge apparatus of FIGS. 1-4 to facilitate BLE communication between devices.

FIG. 13 is a flowchart representative of an example method 1300 that may be performed by the BLE bridge 104 of FIGS. 1-4 to execute a communication operation between the field device MCU 350 of FIG. 3 and the remote device 360 of FIG. 3. The example method 1300 begins at block 1302 when the example BLE bridge 104 identifies supported protocol(s) of a field device. For example, the command processor 322 may determine that the field device MCU 350 of the field device 102 of FIG. 1 supports HART and MODBUS protocols.

At block 1304, the example BLE bridge 104 determines whether a data packet corresponds to a transmit (TX) request from a UART or a receive (RX) request from a BLE stack. For example, the command processor 322 may determine that a data packet corresponds to a data packet received on the receiver transmitter interface 300 of FIG. 3 from the field device MCU 350 to be transmitted via the BLE interface 340 of FIG. 3. In such an example, the command processor 322 may determine that the data packet corresponds to a TX request from a UART.

If, at block, 1304, the example BLE bridge 104 determines that the data packet corresponds to a TX request from a UART, control proceeds to block 1316 to call a protocol handler to process the data packet for a field device. If, at block 1304, the example BLE bridge 104 determines that the data packet corresponds to an RX request from the BLE stack (e.g., a data packet received at the BLE stack handler 330 via the BLE interface 340), then, at block 1306, the BLE bridge 104 determines whether an opcode is authorized. For example, the command processor 322 may determine that an opcode of 0x00 for a data packet is mapped to a permission level of ADMIN as illustrated in FIG. 12B. In such an example, the command processor 322 may compare the permission level of the opcode to a permission level of a user connected to the field device 102 (e.g., a user of the remote device 106, the remote device 106, etc.). For example, the command processor 322 may determine that an opcode is not authorized based on a permission level of ENGINEER of a user of the remote device 106 does not match the permission level of ADMIN needed to execute action corresponding to the opcode of the data packet.

If, at block 1306, the example BLE bridge 104 determines that an opcode is not authorized, control proceeds to block 1312 to reject the RX request and then proceed to block 1318 to transmit an error code to the transmitter of the received data packet. If, at block 1306, the example BLE bridge 104 determines that an opcode is authorized, then, at block 1308, the BLE bridge 104 determines whether the opcode is a protocol opcode. For example, the command processor 322 may determine that the opcode is a protocol opcode because the opcode corresponds to protocol opcode 0x04 corresponding to PROFIBUS PA.

If, at block 1308, the example BLE bridge 104 determines that the opcode is not a protocol opcode, control proceeds to block 1314 to process a radio specific command. For example, the command processor 322 may process a command corresponding to the BLE interface 340 (e.g., by processing a command described above in connection with FIG. 12B). If, at block 1308, the example BLE bridge 104 determines that the opcode is a protocol opcode, then, at block 1310, the BLE bridge 104 determines whether the field device supports the protocol. For example, the command processor 322 may compare a protocol identifier (e.g., a protocol identifier in the example table 800 of FIG. 8) included in the data packet (e.g., included in the data structure AD Data 1 630 of FIG. 6B) to a supported protocol of the field device MCU 350. In such an example, the command processor 322 may compare a protocol identifier of 0x05 corresponding to PROFIBUS PA to a supported protocol of the field device MCU 350. In such an example, the command processor 322 may determine that the protocol is not supported based on the comparison because the field device MCU 350 supports HART and MODBUS protocols and not PROFIBUS PA.

If, at block 1310, the example BLE bridge 104 determines that the protocol is not supported by the field device, then, at block 1312, the BLE bridge 104 rejects the RX request. For example, the command processor 322 may discard the received data packet and proceed to block 1318 to transmit an error code to the transmitter of the received data packet. If, at block 1310, the example BLE bridge 104 determines that the protocol is supported by the field device, control proceeds to block 1316 to call the protocol handler to process the data packet for a field device. For example, the command processor 322 may call the protocol handler 324 of FIG. 3 to process the data packet for the field device MCU 350 of the field device 102. In response to calling the protocol handler to process the data packet for a field device (block 1316), transmitting an error code (block 1318), or processing a radio specific command (block 1314), the example method 1300 concludes.

Figure 14:
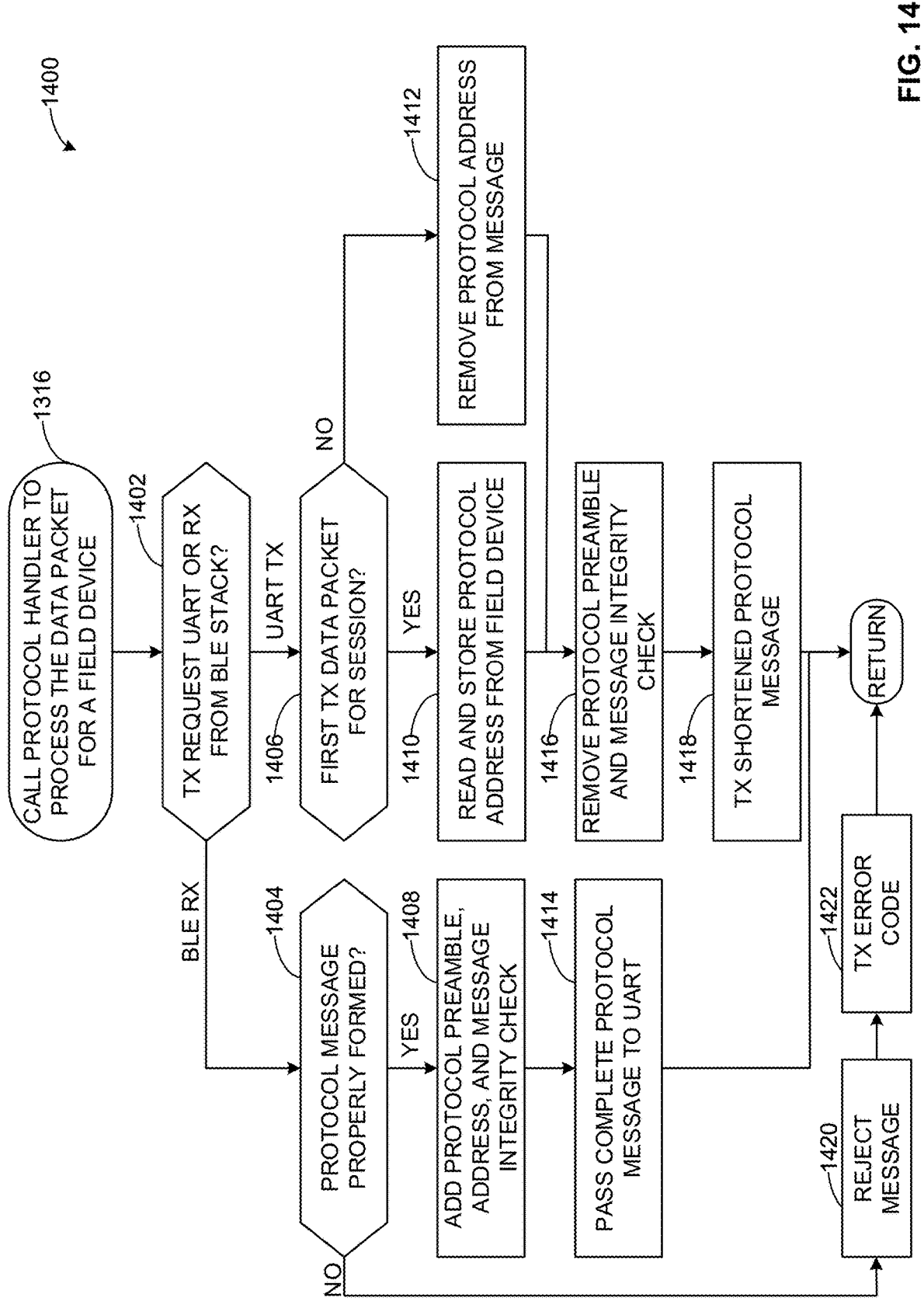

FIG. 14 is a flowchart representative of an example method 1400 that may be performed by the BLE bridge 104 of FIGS. 1-4 to call a protocol handler to process the data packet for a field device. The example process of FIG. 14 may be used to implement the operation of block 1316 of FIG. 13. The example method 1400 begins at block 1402 when the example BLE bridge 104 determines whether a data packet corresponds to a TX request from a UART or a RX from a BLE stack. For example, the protocol handler 324 may determine that a data packet corresponds to a data packet received on the receiver transmitter interface 300 of FIG. 3 from the field device MCU 350 to be transmitted via the BLE interface 340 of FIG. 3. In such an example, the command processor 322 may determine that the data packet corresponds to a UART TX request. In another example, the protocol handler 324 may determine that a data packet corresponds to a data packet received at the BLE interface 340 of FIG. 3 from the remote device 106 of FIG. 1 to be transmitted to the field device MCU 350. In such an example, the command processor 322 may determine that the data packet corresponds to a BLE RX request.

If, at block 1402, the example BLE bridge 104 determines that the data packet corresponds to an RX request from the BLE stack (e.g., a data packet received at the BLE stack handler 330 via the BLE interface 340), control proceeds to block 1404 to determine whether the protocol message is properly formed. For example, the protocol handler 324 may determine that the protocol message is properly formed. If, at block 1404, the example BLE bridge 104 determines that the protocol message is not properly formed, control proceeds to block 1420 to reject the message (e.g., the data packet) and proceed to block 1422 to transmit an error code. If, at block 1404, the example BLE bridge 104 determines that the protocol message is properly formed, control proceeds to block 1408 to add a protocol preamble, address, and message integrity check (MIC). For example, the protocol handler 324 may add a HART protocol preamble, a HART protocol address, and a HART protocol MIC to the received data packet. Alternatively, the example BLE bridge 104 may not perform the function of block 1408 and pass the data packet (e.g., an opcode, a data payload, etc., and/or a combination thereof) to the field device MCU 350.

At block 1414, the example BLE bridge 104 passes a complete protocol message to a UART. For example, the protocol handler 324 may pass the complete HART protocol message to the receiver transmitter interface 300 to transmit the HART protocol message to the field device MCU 350. In response to passing the complete protocol message to the UART, the example method returns to block 1312 of FIG. 13.

If, at block, 1402, the example BLE bridge 104 determines that the data packet corresponds to a TX request from a UART, then, at block 1406, the BLE bridge 104 determines whether the data packet is a first TX data packet for a session. For example, the protocol handler 324 may determine that the data packet received from the field device MCU 350 is not the first TX data packet for the communication session. If, at block 1406, the example BLE bridge 104 determines that the data packet is not the first TX data packet for the session, control proceeds to block 1412 to remove a protocol address from the message. For example, the protocol handler 324 may remove a HART protocol address from a data packet received from the field device MCU 350.

If, at block 1406, the example BLE bridge 104 determines that the data packet is the first TX data packet for the session, then, at block 1410, the BLE bridge 104 reads and stores a protocol address from the field device. For example, the protocol handler 324 may read a HART protocol address from the field device MCU 350 and store the HART protocol address for future communication operations (e.g., store the HART protocol address in a database, in volatile memory, in non-volatile memory, etc.).

At block 1416, the example BLE bridge 104 removes a protocol preamble and message integrity check. For example, the protocol handler 324 may remove a HART protocol preamble and a HART protocol message integrity check.

At block 1418, the example BLE bridge 104 transmits (TX) the shortened protocol message. For example, the protocol handler 324 may direct the BLE stack handler 330 to transmit the shortened protocol message to the remote device 360 via the BLE interface 340. In some examples, by removing protocol information of a data packet received from the field device MCU 350 prior to transmitting to the remote device 360, power of the field device 102 can be conserved by reducing an amount of data to be sent (e.g., reduce an amount of time the BLE interface 340 is active). In some examples, by removing protocol information of a data packet received from the field device MCU 350 prior to transmitting to the remote device 360, a communication data rate can be increased by sending additional data in place of the removed information. In response to transmitting the shortened protocol message at block 1418, the example method returns to block 1316 of FIG. 13.

Figure 15:
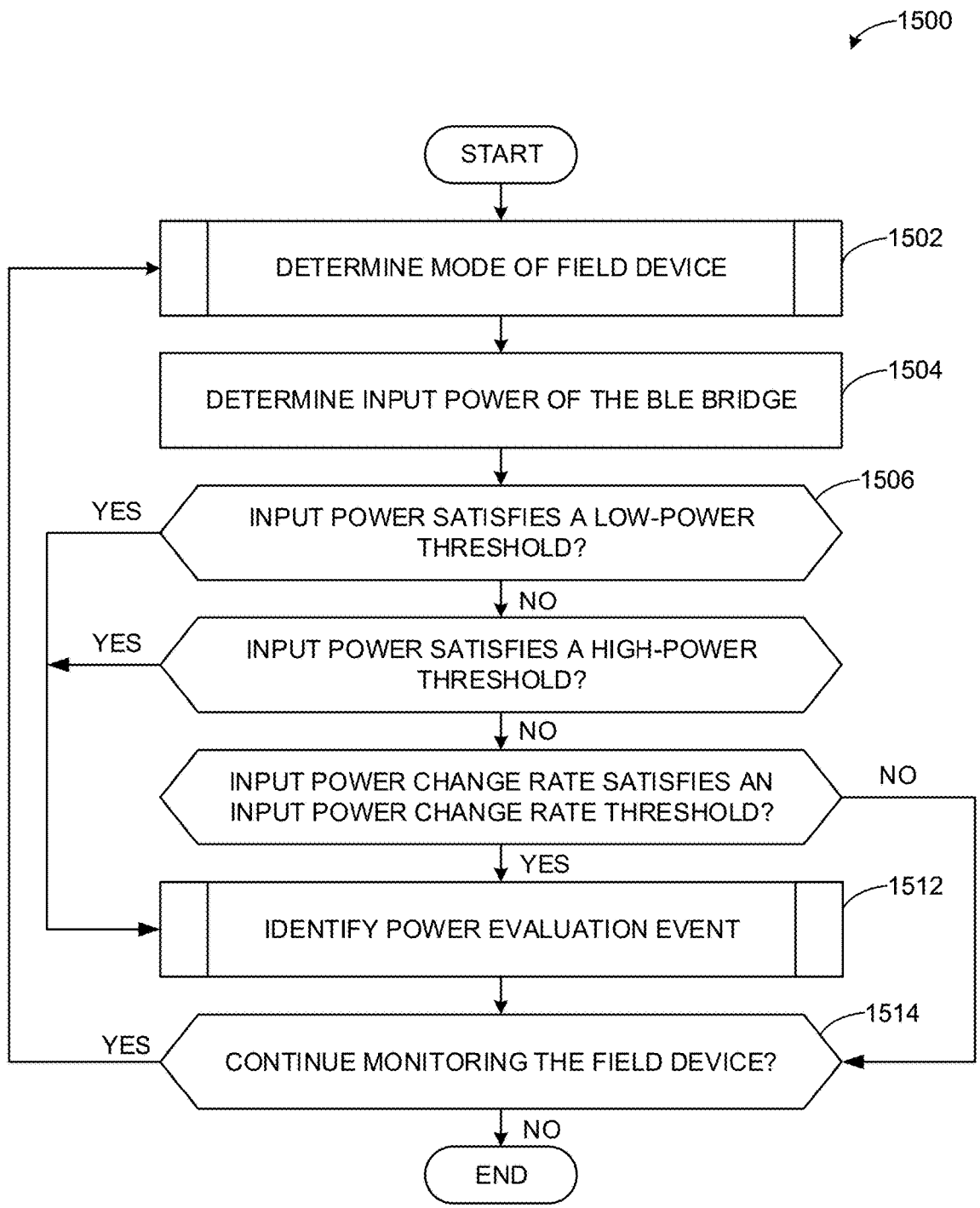

FIG. 15 is a flowchart representative of an example method 1500 that may be performed by the BLE bridge 104 of FIGS. 1-4 to identify a power evaluation event. The example method 1500 begins at block 1502 when the example BLE bridge 104 determines a mode of a field device. For example, the power manager 326 may determine that the field device 102 of FIGS. 1-2 is in a maintenance mode. In such an example, the power manager 326 may disable one or more process control functions of the field device 102 and re-allocate power corresponding to the disabled functions to the BLE bridge 104 (e.g., to boost a transmission power of the BLE interface 340).

At block 1504, the example BLE bridge 104 determines an input power of the BLE bridge. For example, the power manager 326 may query the field device MCU 350 to obtain an input current measurement or an input voltage measurement of a circuit powering the BLE bridge 104 or a component of the BLE bridge 104 such as the BLE interface 340.

At block 1506, the example BLE bridge 104 determines whether the input power satisfies a low-power threshold. For example, the power manager 326 may compare an input current of 4 mA to a low-current threshold of 4.5 mA and determine that the input current satisfies the low-current threshold based on the input current being less than the low-current threshold.

If, at block 1506, the example BLE bridge 104 determines that the input power satisfies the low-power threshold, control proceeds to block 1512 to identify a power evaluation event. If, at block 1506, the example BLE bridge 104 determines that the input power does not satisfy the low-power threshold, then, at block 1508, the BLE bridge 104 determines whether the input power satisfies a high-power threshold. For example, the power manager 326 may compare an input current of 19.8 mA to a high-current threshold of 19.5 mA and determine that the input current satisfies the high-current threshold based on the input current being greater than the high-current threshold.

If, at block 1508, the example BLE bridge 104 determines that the input power satisfies the high-power threshold, control proceeds to block 1512 to identify a power evaluation event. If, at block 1508, the example BLE bridge 104 determines that the input power does not satisfy the high-power threshold, then, at block 1510, the BLE bridge 104 determines whether the input power change rate satisfies an input power change rate threshold. For example, the power manager 326 may calculate an input power change rate of 3 mA per control cycle for the field device 102. In such an example, the power manager 326 may compare the input power change rate of 3 mA to a 2 mA input power change rate threshold and determine that the input power change rate satisfies the input power change rate threshold based on the input power change rate being greater than the input power change rate threshold.

If, at block 1510, the example BLE bridge 104 determines that the input power change rate does not satisfy the input power change rate threshold, control proceeds to block 1514 to determine whether to continue monitoring the field device. If, at block 1510, the example BLE bridge 104 determines that the input power change rate satisfies the input power change rate threshold, then, at block 1512, the BLE bridge 104 identifies a power evaluation event. For example, the power manager 326 may adjust a parameter of the BLE interface 340 based on an available power budget of the BLE bridge 104.

At block 1514, the example BLE bridge 104 determines whether to continue monitoring the field device. For example, the power manager 326 may determine to continue monitoring an input power of the BLE interface 340 of the field device 102. If, at block 1514, the example BLE bridge 104 determines to continue monitoring the field device, control returns to block 1502 to determine the mode of the field device, otherwise the example method 1500 concludes.

Figure 16:
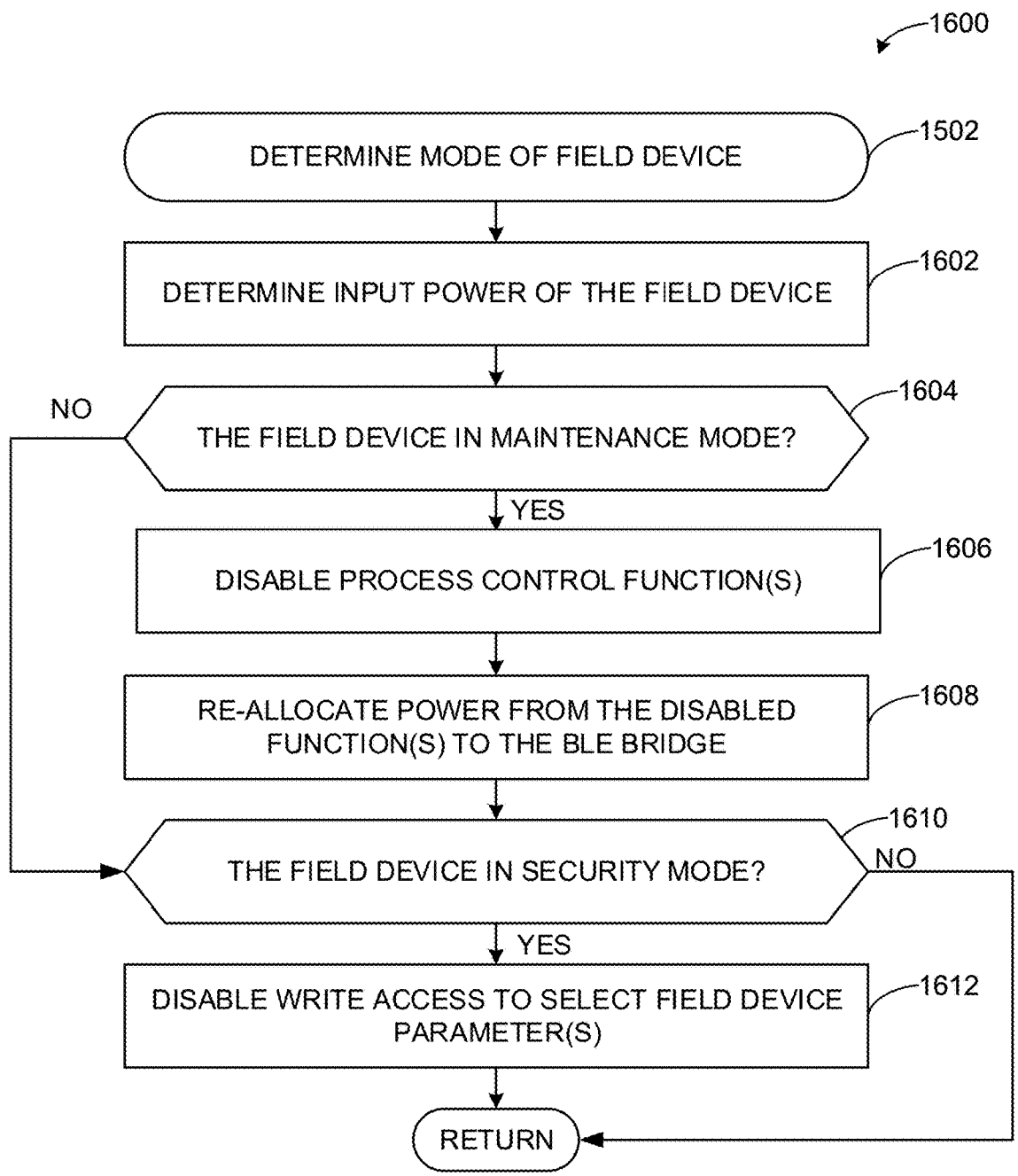

FIG. 16 is a flowchart representative of an example method 1600 that may be performed by the BLE bridge 104 of FIGS. 1-4 to determine a mode of a field device. The example process of FIG. 16 may be used to implement the operation of block 1502 of FIG. 15. The example method 1600 begins at block 1602 when the example BLE bridge 104 determines an input power of the BLE bridge. For example, the power manager 326 may query the field device MCU 350 to obtain an input current measurement or an input voltage measurement of a circuit powering the BLE bridge 104 or a component of the BLE bridge 104 such as the BLE interface 340. For example, the power manager 326 may determine that the input current measurement of the BLE interface 340 of FIG. 3 is 8 mA.

At block 1604, the example BLE bridge 104 determines whether the field device is in maintenance mode. For example, the power manager 326 may determine that the field device 102 is in maintenance mode based on querying the database 355 of FIG. 3. If, at block 1604, the example BLE bridge 104 determines that the field device is not in maintenance mode, control proceeds to block 1610 to determine whether the field device is in security mode. If, at block 1604, the example BLE bridge 104 determines that the field device is in maintenance mode, then, at block 1606, the BLE bridge 104 disables process control function(s). For example, the power manager 326 may direct the field device MCU 350 of FIG. 3 to disable one or more primary functions of the field device 102.

At block 1608, the example BLE bridge 104 re-allocates power from the disabled function(s) to the BLE bridge. For example, the power manager 326 may re-allocate the power corresponding to the one or more disabled functions to the BLE stack handler 330, the BLE interface 340, etc. For example, the BLE stack handler 330 may increase a transmission power of the BLE interface 340 based on the re-allocated power (e.g., based on an increase in the available power budget allocated to the BLE bridge 104).

At block 1610, the example BLE bridge 104 determines whether the field device is in security mode. For example, the power manager 326 may determine that the field device 102 is in security mode based on querying the database 355 of FIG. 3. If, at block 1610, the example BLE bridge 104 determines that the field device is not in security mode, control proceeds to return to block 1404 of FIG. 15 to determine an input power of the field device. If, at block 1610, the example BLE bridge 104 determines that the field device is in security mode, then, at block 1612, the BLE bridge 104 disables writes access to select field device parameter(s). For example, the power manager 326 may disable write access to one or more parameters of the BLE bridge 104, the field device 102, etc., such as a firmware version, a calibration version, an error log, a BLE interface transmission power, etc., and/or a combination thereof. In response to disabling write access to the select field device parameter(s), the example method 1600 returns to block 1504 of FIG. 15 to determine an input power of the field device.

Figure 17:
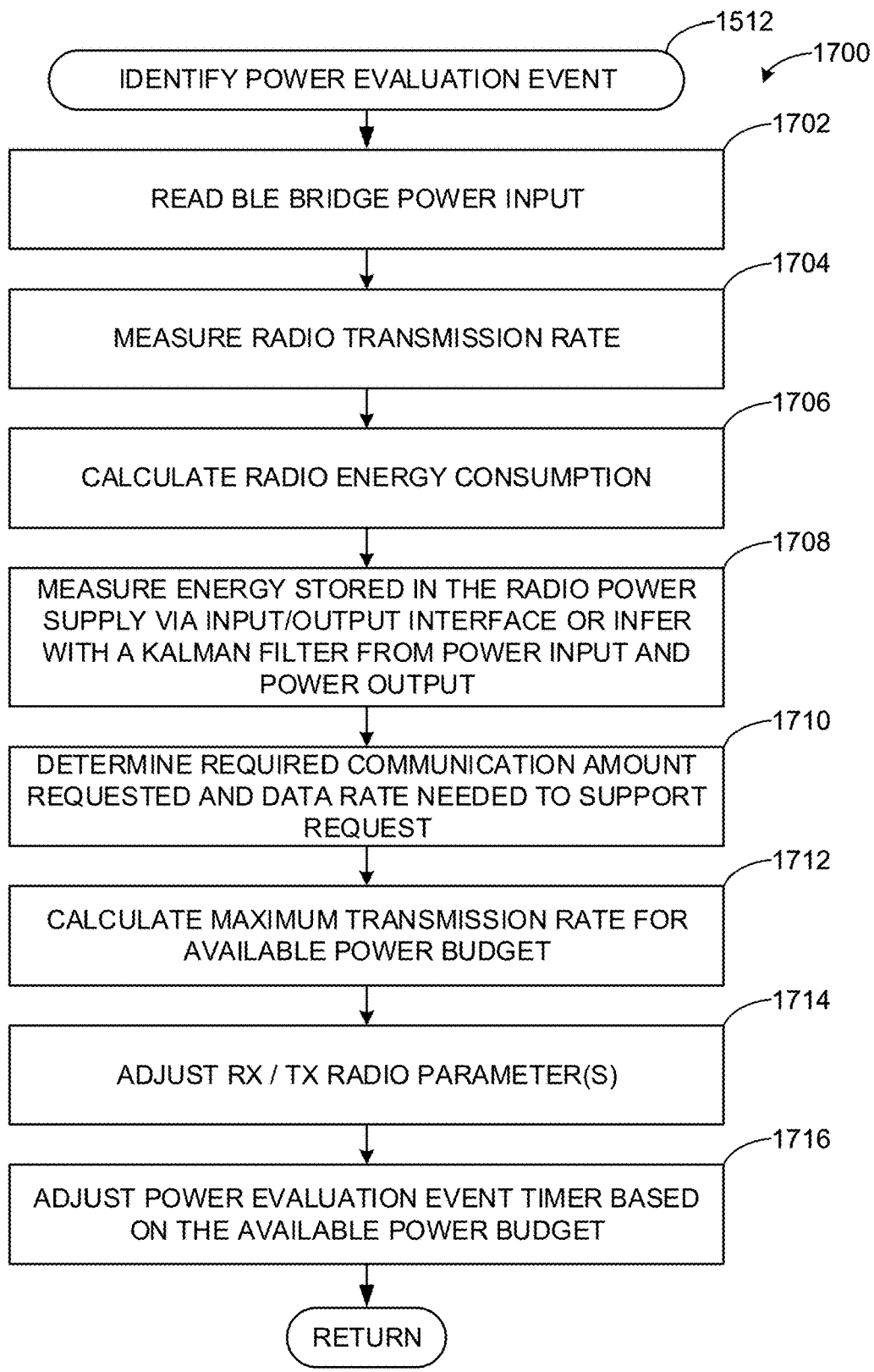

FIG. 17 is a flowchart representative of an example method 1700 that may be performed by the BLE bridge 104 of FIGS. 1-4 to perform a power evaluation event and adjust a parameter of a BLE radio (e.g., the BLE interface 340). The example method 1700 begins at block 1702 when the example BLE bridge 104 reads a BLE bridge power input. For example, the power manager 326 may query the field device MCU 350 to measure or obtain a current value, a voltage value, etc., of a power input to the BLE bridge 104 or a component of the BLE bridge 104 such as the BLE interface 340. At block 1704, the example BLE bridge 104 measures a radio transmission rate. For example, the power manager 326 may measure a radio transmission rate of the BLE interface 340 in bytes/second.

At block 1706, the example BLE bridge 104 calculates a radio energy consumption. For example, the power manager 326 may calculate a radio energy consumption of the BLE interface 340 as described above in accordance with Equations (1)-(2).

At block 1708, the example BLE bridge 104 measures energy stored in the radio power supply via an input/output interface or infer with a Kalman filter from power input and power output. For example, the power manager 326 may determine an amount of energy stored in the BLE interface 340 via a GPIO interface, an analog-to-digital converter interface, etc., and/or infer with a Kalman filter based on the power input and the power output of the field device 102.

At block 1710, the example BLE bridge 104 determines a required communication data amount requested and a data rate needed to support the request. For example, the power manager 326 may determine an amount of data to be transferred from the remote device 106 to the field device 102 and a data rate needed to support the transfer.

At block 1712, the example BLE bridge 104 calculates a maximum transmission rate for an existent power budget. For example, the power manager 326 may calculate a maximum data transmission rate for an available power budget allocated to the BLE interface 340.

At block 1714, the example BLE bridge 104 adjusts RX/TX radio parameters. For example, the power manager 326 may adjust an antenna power of the BLE interface 340 based on the maximum transmission rate, the available power budget, the amount of data to be transferred, etc., and/or a combination thereof.

At block 1716, the example BLE bridge 104 adjusts a power evaluation event timer based on the existent power budget. For example, the power manager 326 may adjust the time between power evaluation events as described above in accordance with Equation (3). In response to adjusting the power evaluation event timer, the example method 1700 returns to block 1514 of FIG. 15 to determine whether to continue monitoring the field device.

Figure 18:
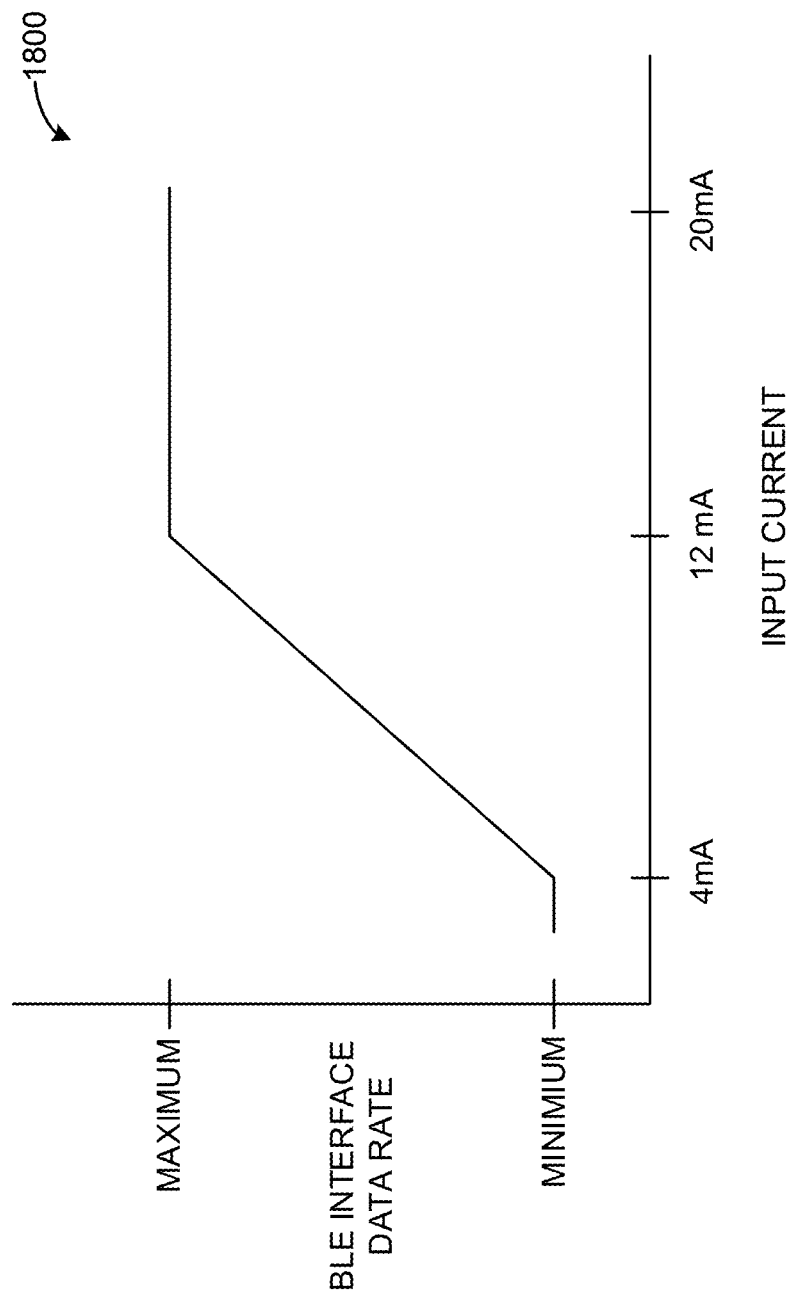
FIG. 18 is an example graph depicting a data rate of the example BLE bridge apparatus of FIGS. 1-4 as a function of input current of the field device of FIGS. 1-2.

FIG. 18 is an example graph 1800 depicting a data rate of the example BLE bridge apparatus of FIGS. 1-4 as a function of input current of the field device 102 of FIGS. 1-2. For example, the input current of BLE bridge 104, the BLE interface 340, etc., is based on the input current of the field device 102. In the illustrated example, the BLE bridge 104 sets a data rate of the BLE interface 340 of FIG. 3 at a minimum data rate (e.g., a fixed minimum data rate) at 4 mA or less. For example, the power manager 326 may direct the BLE stack handler 330 to decrease a data rate of the BLE interface 340 to a data rate of 1-2 messages per second (e.g., 1-2 data packets per second), where each message corresponds to 256 bytes. Alternatively, any other input current value may be used to set the minimum data rate of the BLE interface 340. Additionally or alternatively, the input power and/or the input voltage may be used to determine the data rate.

In the illustrated example, the BLE bridge 104 sets a data rate of the BLE interface 340 of FIG. 3 at a maximum data rate (e.g., a fixed maximum data rate) at 12 mA or greater. For example, the power manager 326 may direct the BLE stack handler 330 to increase a data rate of the BLE interface 340 to a data rate of 14-16 kilobytes per second. Alternatively, any other input current value may be used to set the maximum data rate of the BLE interface 340. In the illustrated example, the BLE bridge 104 adjusts a data rate of the BLE interface 340 based on the input current when the input current is above a minimum input current level (e.g., 3.8 mA, 4 mA, 4.2 mA, etc.), etc., up to a maximum input current level (e.g., 12 mA, 16 mA, 20 mA, etc.), etc. In the illustrated example, the BLE bridge 104 does not increase the data rate of the BLE interface 340 when the input current satisfies a maximum input current threshold (e.g., 12 mA, 16 mA, 20 mA, etc.), etc., to prevent the BLE bridge 104 from using power that the field device MCU 350 of FIG. 3 may need to perform one or more process control functions of the field device 102.

Figure 19:
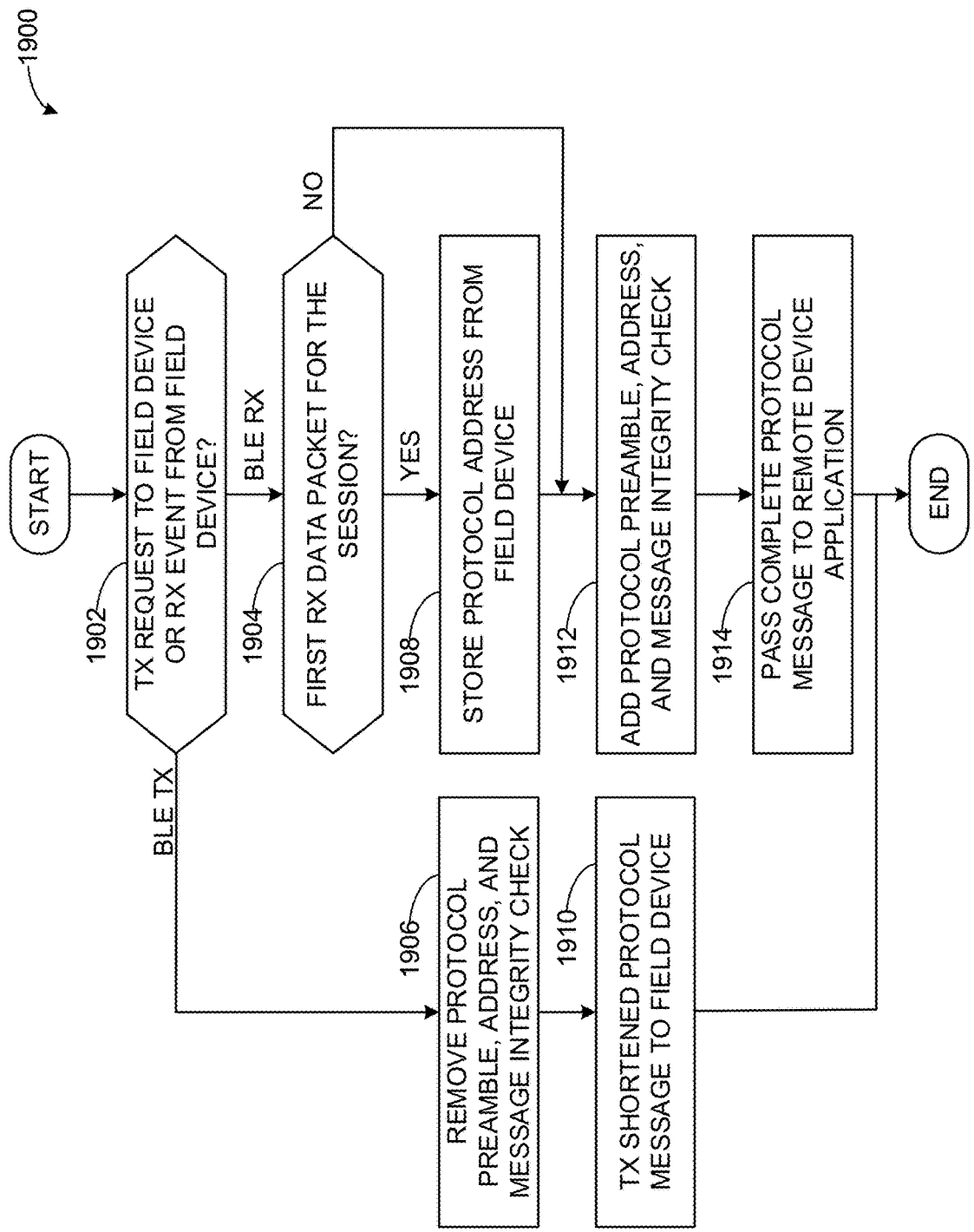
FIG. 19 is a flowchart representative of an example method that may be performed using the remote devices of FIGS. 1-4 to facilitate BLE communication between devices.

A flowchart representative of example hardware logic, machine readable instructions, hardware implemented state machines, and/or any combination thereof for implementing the example remote device 106 of FIG. 1, the example Remote Devices 1-3 200, 202, 204 of FIG. 2, and/or the example remote device 360 of FIG. 3 is shown in FIG. 19. The machine readable instructions may be an executable program or portion of an executable program for execution by a computer processor such as a processor 2112 shown in the example processor platform 2100 discussed below in connection with FIG. 21. The program may be embodied in software stored on a non-transitory computer readable storage medium such as a CD-ROM, a floppy disk, a hard drive, a DVD, a Blu-ray disk, or a memory associated with the processor 2112, but the entire program and/or parts thereof could alternatively be executed by a device other than the processor 2112 and/or embodied in firmware or dedicated hardware. Further, although the example program is described with reference to the flowchart illustrated in FIG. 19, many other methods of implementing the example the example remote device 106, the example Remote Devices 1-3 200, 202, 204, and/or the example remote device 360 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an op-amp, a logic circuit, etc.) structured to perform the corresponding operation without executing software or firmware.

As mentioned above, the example process of FIG. 19 may be implemented using executable instructions (e.g., computer and/or machine readable instructions) stored on a non-transitory computer and/or machine readable medium such as a hard disk drive, a flash memory, a read-only memory, a CD, a DVD, a cache, a random-access memory and/or any other storage device or storage disk in which information is stored for any duration (e.g., for extended time periods, permanently, for brief instances, for temporarily buffering, and/or for caching of the information).

FIG. 19 is a flowchart representative of an example method 1900 that may be performed by the remote device 106 of FIG. 1, the Remote Devices 1-3 200, 202, 204 of FIG. 2, and/or the remote device 360 of FIG. 3 to execute a communication operation using BLE. The example method 1900 begins at block 1902 when the remote device 106 determines whether a data packet corresponds to a TX request to a field device or a RX from a field device. For example, the remote device 106 may determine that a data packet corresponds to a RX request from the field device 102 of FIG. 1 which corresponds to a BLE RX event (e.g., receiving information from the field device 102 via a BLE radio). In another example, the remote device 106 may determine that a data packet corresponds to a TX request to the field device 102 which corresponds to a BLE TX event (e.g., transmitting information from the remote device 106 to the field device 102 via a BLE radio).

If, at block 1902, the example remote device 106 determines that a data packet corresponds to a TX request to a field device, control proceeds to block 1906 to remove a protocol preamble, an address, and a message integrity check. For example, the remote device 106 may remove protocol information from a data packet prior to sending the data packet to the field device 102. By removing the protocol information from the data packet prior to sending the data packet to the field device 102, the example remote device 106 may cause a reduction in an amount of power necessary for the field device 102 to receive the data packet. At block 1910, the example remote device 106 transmits the shortened protocol message to the field device. For example, the remote device 106 may transmit a data packet with removed protocol information to the field device 102. In response to transmitting the shortened protocol message to the field device, the example method 1900 concludes.

If, at block 1902, the example remote device 106 determines that the data packet corresponds to a RX event from the field device, then, at block 1904, the remote device 106 determines whether the data packet is the first RX data packet for the session. If, at block 1904, the example remote device 106 determines that the data packet is not the first RX data packet for the session, control proceeds to block 1912, otherwise the remote device 106 proceeds to block 1908 to store a protocol address from the field device. For example, the remote device 106 may store a HART protocol address of the field device 102 of FIG. 1 for future communication operations.

At block 1912, the example remote device 106 adds a protocol preamble, address, and message integrity check. For example, the remote device 106 may add a HART protocol preamble, a HART protocol address, and a HART protocol message integrity check based on the field device 102 supporting HART protocol (e.g., based on the stored protocol address of the field device 102).

At block 1914, the example remote device 106 passes a complete protocol message to the remote device application. For example, the remote device 106 may pass a data packet obtained from the field device 102 with added protocol information to an application (e.g., a software program) executing on the remote device 106. In such an example, the application may interpret the protocol-information added data packet as a typical protocol packet received from the field device 102 via a typical industrial communication protocol compared to via a BLE radio. In response to passing the complete protocol message to the remote device application, the example method 1900 concludes.

Figure 20:
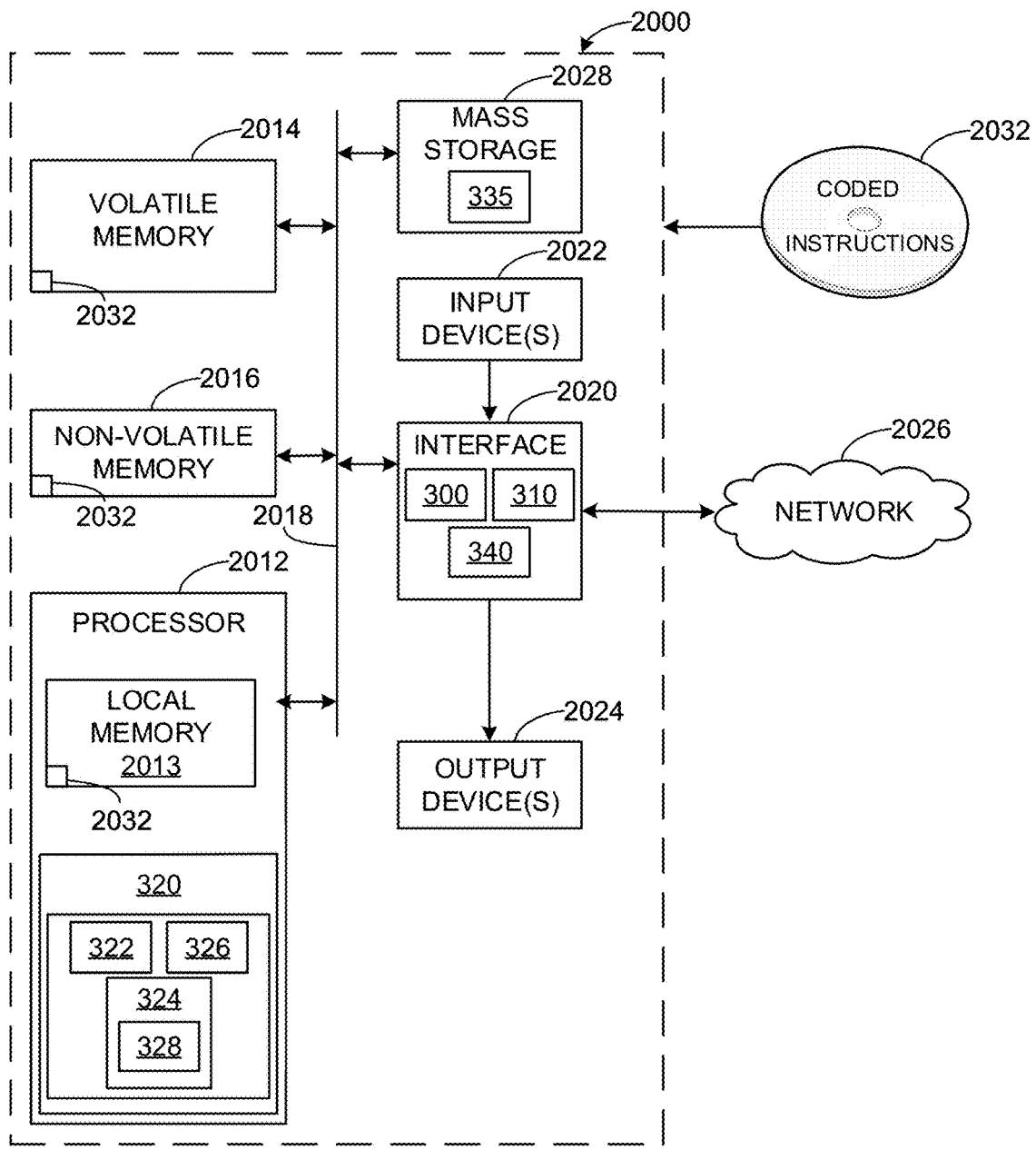
FIG. 20 is a block diagram of an example processor platform structured to execute machine readable instructions to implement the methods of FIGS. 13-17 and/or the example BLE bridge apparatus of FIGS. 1-4 to implement the examples disclosed herein.

FIG. 20 is a block diagram of an example processor platform 2000 structured to execute the instructions of FIGS. 13-17 to implement the BLE bridge 104 of FIGS. 1-4. The processor platform 2000 can be, for example, a field device controller, a controller, a valve positioner, or any other type of computing device.

The processor platform 2000 of the illustrated example includes a processor 2012. The processor 2012 of the illustrated example is hardware. For example, the processor 2012 can be implemented by one or more integrated circuits, logic circuits, microprocessors, GPUs, DSPs, or controllers from any desired family or manufacturer. The hardware processor may be a semiconductor based (e.g., silicon based) device. In this example, the processor 2012 implements the example platform manager 320, the example command processor 322, the example protocol handler 324, the example power manager 326, the example RX/TX interface handler 328, the example BLE stack handler 330.

The processor 2012 of the illustrated example includes a local memory 2013 (e.g., a cache). The processor 2012 of the illustrated example is in communication with a main memory including a volatile memory 2014 and a non-volatile memory 2016 via a bus 2018. The volatile memory 2014 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 2016 may be implemented by flash memory and/or any other desired type of memory device. Access to the main memory 2014, 2016 is controlled by a memory controller.

The processor platform 2000 of the illustrated example also includes an interface circuit 2020. The interface circuit 2020 may be implemented by any type of interface standard, such as an Ethernet interface, a universal serial bus (USB), a Bluetooth® interface, a BLE radio interface, a near field communication (NFC) interface, a UART interface, a GPIO interface, and/or a peripheral component interconnect (PCI) express interface. The example interface circuit 2020 implements the example receiver transmitter interface 300, the example input/output interface 310, and the example BLE interface 340.

In the illustrated example, one or more input devices 2022 are connected to the interface circuit 2020. The input device(s) 2022 permit(s) a user to enter data and/or commands into the processor 2012. The input device(s) can be implemented by, for example, an audio sensor, a microphone, a camera (still or video), a keyboard, a button, a mouse, a touchscreen, a track-pad, a trackball, an isopoint device, and/or a voice recognition system.

One or more output devices 2024 are also connected to the interface circuit 2020 of the illustrated example. The output devices 2024 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer and/or speaker. The interface circuit 2020 of the illustrated example, thus, typically includes a graphics driver card, a graphics driver chip and/or a graphics driver processor.

The interface circuit 2020 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 2026. The communication can be via, for example, an Ethernet connection, a digital subscriber line (DSL) connection, a telephone line connection, a coaxial cable system, a satellite system, a line-of-sight wireless system, a cellular telephone system, a Bluetooth network, a BLE network, etc.

The processor platform 2000 of the illustrated example also includes one or more mass storage devices 2028 for storing software and/or data. Examples of such mass storage devices 2028 include floppy disk drives, hard drive disks, compact disk drives, Blu-ray disk drives, redundant array of independent disks (RAID) systems, and DVD drives. The example mass storage device 2028 implements the database 355.

The machine executable instructions 2032 of FIGS. 13-17 may be stored in the mass storage device 2028, in the volatile memory 2014, in the non-volatile memory 2016, and/or on a removable non-transitory computer readable storage medium such as a CD or DVD.

Figure 21:
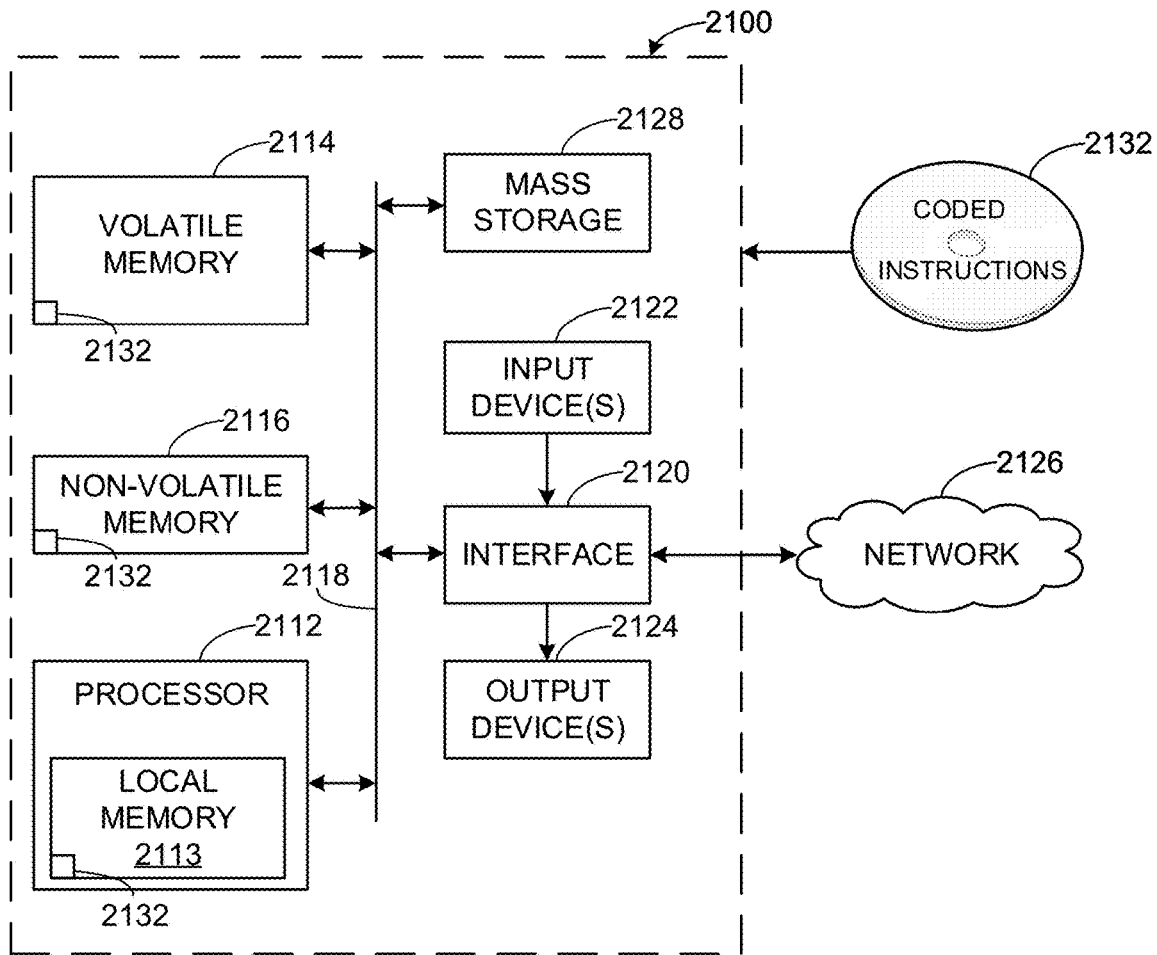
FIG. 21 is a block diagram of an example processor platform structured to execute machine readable instructions to implement the method of FIG. 19 and/or the example remote device of FIGS. 1-4 to implement the examples disclosed herein.

FIG. 21 is a block diagram of an example processor platform 2100 structured to execute the instructions of FIG. 19 to implement the remote device 106 of FIG. 1, the Remote Devices 1-3 200, 202, 204 of FIG. 2, and/or the remote device 360 of FIG. 3. The processor platform 2100 can be, for example, a personal computer, a mobile device (e.g., a cell phone, a smart phone, a tablet such as an iPad™), a personal digital assistant (PDA), or any other type of computing device.

The processor platform 2100 of the illustrated example includes a processor 2112. The processor 2112 of the illustrated example is hardware. For example, the processor 2112 can be implemented by one or more integrated circuits, logic circuits, microprocessors, GPUs, DSPs, or controllers from any desired family or manufacturer. The hardware processor may be a semiconductor based (e.g., silicon based) device.

The processor 2112 of the illustrated example includes a local memory 2113 (e.g., a cache). The processor 2112 of the illustrated example is in communication with a main memory including a volatile memory 2114 and a non-volatile memory 2116 via a bus 2121. The volatile memory 2114 may be implemented by SDRAM, DRAM, RDRAM®, and/or any other type of random access memory device. The non-volatile memory 2116 may be implemented by flash memory and/or any other desired type of memory device. Access to the main memory 2114, 2116 is controlled by a memory controller.

The processor platform 2100 of the illustrated example also includes an interface circuit 2120. The interface circuit 2120 may be implemented by any type of interface standard, such as an Ethernet interface, a USB, a Bluetooth® interface, an NFC interface, a BLE radio interface, a UART interface, a GPIO interface, and/or a PCI express interface.

In the illustrated example, one or more input devices 2122 are connected to the interface circuit 2120. The input device(s) 2122 permit(s) a user to enter data and/or commands into the processor 2112. The input device(s) can be implemented by, for example, an audio sensor, a microphone, a camera (still or video), a keyboard, a button, a mouse, a touchscreen, a track-pad, a trackball, an isopoint device, and/or a voice recognition system.

One or more output devices 2124 are also connected to the interface circuit 2120 of the illustrated example. The output devices 2124 can be implemented, for example, by display devices (e.g., an LED, an OLED, an LCD, a CRT display, an IPS display, a touchscreen, etc.), a tactile output device, a printer and/or speaker. The interface circuit 2120 of the illustrated example, thus, typically includes a graphics driver card, a graphics driver chip and/or a graphics driver processor.

The interface circuit 2120 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 2126. The communication can be via, for example, an Ethernet connection, a digital subscriber line (DSL) connection, a telephone line connection, a coaxial cable system, a satellite system, a line-of-sight wireless system, a cellular telephone system, a Bluetooth network, a BLE network, etc.

The processor platform 2100 of the illustrated example also includes one or more mass storage devices 2128 for storing software and/or data. Examples of such mass storage devices 2128 include floppy disk drives, hard drive disks, compact disk drives, Blu-ray disk drives, RAID systems, and DVD drives.

The machine executable instructions 2132 of FIG. 19 may be stored in the mass storage device 2128, in the volatile memory 2114, in the non-volatile memory 2116, and/or on a removable non-transitory computer readable storage medium such as a CD or DVD.

From the foregoing, it will be appreciated that example methods, apparatus and articles of manufacture have been disclosed that bridge communications between devices using low-powered devices such as BLE transceivers. Disclosed network bridges enable an example remote device to form a peer-to-peer connection with a field device to calibrate or configure the field device and/or, more generally, to interface with the field device. The example BLE bridge apparatus executes communication operations based on a direction of data flow. In response to obtaining data packets from a field device MCU, the BLE bridge apparatus removes protocol information from the obtained data packets and transmits the processed data packets to a remote device via BLE. In response to obtaining data packets from a remote device, the BLE bridge apparatus generates protocol packets based on a supported protocol of the field device. By removing protocol information from a data packet prior to submission, the field device can transmit and/or receive more data on a reduced power budget.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
 a field device including a network bridge, the network bridge to:
  obtain a first data packet including a first payload having a first size at a first Bluetooth Low Energy (BLE) radio of the network bridge, over a BLE network, from a second BLE radio of a remote device, and formatted according to a BLE communication protocol, the remote device to generate the first data packet by:
   removing first data from a second data packet including a second payload having a second size less than the first size;
   generating the first payload by increasing the second size of the second payload to the first size; and
   adding second data to the first payload, the first data and the second data packet formatted according to an industrial communication protocol; and
  convert the first data packet into a third data packet formatted according to the industrial communication protocol, the conversion in response to determining that the first payload is properly formed, the conversion including adding the first data to the first payload.

2. The apparatus of claim 1, wherein the network bridge includes a platform manager to determine whether the first payload is properly formed based on at least one of evaluating a protocol command, a data length corresponding to the protocol command, or a range of a parameter value included in the first data packet.

3. The apparatus of claim 2, wherein the platform manager rejects the first data packet based on determining that the first payload is not properly formed.

4. The apparatus of claim 1, wherein the first data packet includes an extendible, flexible data structure based on a requirement from an operator of the field device.

5. The apparatus of claim 1, wherein the field device includes at least one processor, the first data including a first industrial protocol address associated with the remote device, and wherein:
in response to the network bridge converting the first data packet, the at least one processor to:
generate a fourth data packet formatted according to the industrial communication protocol, the fourth data packet including a second industrial protocol address associated with the field device, a protocol preamble, and a message integrity check; and
transmit the fourth data packet to the network bridge; and
the network bridge to:
convert the fourth data packet into a fifth data packet formatted according to the BLE communication protocol, the conversion including removing at least one of the second industrial protocol address, the protocol preamble, or the message integrity check; and
transmit the fifth data packet to the second BLE radio of the remote device.

6. The apparatus of claim 1, wherein the industrial communication protocol is one of a Highway Addressable Remote Transducer (HART) communication protocol, a PROFIBUS communication protocol, a FOUNDATION Fieldbus communication protocol, or a MODBUS communication protocol.

7. The apparatus of claim 1, wherein the remote device is one of a server computer, a desktop computer, a laptop computer, a tablet, a smartphone, or a personal digital assistant.

8. A method comprising:
obtaining, by executing one or more machine readable instructions via a network bridge of a field device, a first data packet including a first payload having a first size at a first Bluetooth Low Energy (BLE) radio of the network bridge, over a BLE network, from a second BLE radio of a remote device, and formatted according to a BLE communication protocol, the remote device to generate the first data packet by:
removing first data from a second data packet including a second payload having a second size less than the first size;
generating the first payload by increasing the second size of the second payload to the first size; and
adding second data to the first payload, the first data and the second data packet formatted according to an industrial communication protocol; and
converting, by executing one or more machine readable instructions via the network bridge, the first data packet into a third data packet formatted according to the industrial communication protocol, the conversion in response to determining that the first payload is properly formed, the conversion including adding the first data to the first payload.

9. The method of claim 8, wherein the determining that the first payload is properly formed is based on at least one of evaluating a protocol command, a data length corresponding to the protocol command, or a range of a parameter value included in the first data packet.

10. The method of claim 9, further including rejecting the first data packet based on determining that the first payload is not properly formed.

11. The method of claim 8, wherein the first data packet includes an extendible, flexible data structure based on a requirement from an operator of the field device.

12. The method of claim 8, wherein the first data packet includes a first industrial protocol address associated with the remote device, and further including:
in response to converting the first data packet, generating a fourth data packet formatted based on the industrial communication protocol, the fourth data packet including a second industrial protocol address associated with the field device, a protocol preamble, and a message integrity check;
transmitting the fourth data packet to the network bridge;
removing at least one of the second industrial protocol address, the protocol preamble, or the message integrity check from the fourth data packet to generate a fifth data packet;
converting the fifth data packet into a sixth data packet formatted based on the BLE communication protocol; and
transmitting the sixth data packet to the second BLE radio of the remote device.

13. A non-transitory machine readable storage medium comprising instructions that, when executed, cause a network bridge of a field device to at least:
obtain a first data packet including a first payload having a first size at a first Bluetooth Low Energy (BLE) radio of the network bridge, over a BLE network, from a second BLE radio of a remote device, and formatted according to a BLE communication protocol, the remote device to generate the first data packet by:
removing first data from a second data packet including a second payload having a second size less than the first size;
generating the first payload by increasing the second size of the second payload to the first size; and
adding second data to the first payload, the first data and the second data packet formatted according to an industrial communication protocol; and
convert the first data packet into a third data packet formatted according to the industrial communication protocol, the conversion in response to determining that the first payload is properly formed, the conversion including adding the first data to the first payload.

14. The non-transitory machine readable storage medium of claim 13, wherein the instructions, when executed, cause the network bridge to at least determine whether the first payload is properly formed based on at least one of evaluating a protocol command, a data length corresponding to the protocol command, or a range of a parameter value included in the first data packet.

15. The non-transitory machine readable storage medium of claim 14, wherein the instructions, when executed, cause the network bridge to at least reject the first data packet based on determining that the first payload is not properly formed.

16. The non-transitory machine readable storage medium of claim 13, wherein the first data packet includes an extendible, flexible data structure based on a requirement from an operator of the field device.

17. The non-transitory machine readable storage medium of claim 13, wherein the instructions, when executed, cause the network bridge to at least:
  in response to converting the first data packet, obtain a fourth data packet formatted according to the industrial communication protocol, the fourth data packet including a second industrial protocol address associated with the field device;
  remove the second industrial protocol address from the fourth data packet to generate a fifth data packet;
  convert the fifth data packet into a sixth data packet formatted according to the BLE communication protocol; and
  transmit the sixth data packet to the second BLE radio.

18. The apparatus of claim 1, wherein the first data is a first industrial communication protocol address associated with the remote device, and the network bridge to:
  obtain a fourth data packet from the field device, the fourth data packet including a second industrial communication protocol address associated with the field device, an industrial communication protocol preamble, and message integrity check data;
  in response to determining that the fourth data packet is associated with an initial data packet of a communication session:
    remove the industrial communication protocol preamble and the message integrity check data from the fourth data packet to generate a fifth data packet; and
    transmit the fifth data packet to the second BLE radio of the remote device; and
  in response to determining that the fourth data packet is not associated with the initial data packet of the communication session:
    remove the second industrial communication protocol address, the industrial communication protocol preamble, and the message integrity check data from the fourth data packet to generate a sixth data packet; and
    transmit the sixth data packet to the second BLE radio of the remote device.

19. The method of claim 8, wherein the first data is a first industrial communication protocol address associated with the remote device, and further including:
  obtaining a fourth data packet from the field device, the fourth data packet including a second industrial communication protocol address associated with the field device, an industrial communication protocol preamble, and message integrity check data;
  in response to determining that the fourth data packet is associated with an initial data packet of a communication session:
    removing the industrial communication protocol preamble and the message integrity check data from the fourth data packet to generate a fifth data packet; and
    transmitting the fifth data packet to the second BLE radio of the remote device; and
  in response to determining that the fourth data packet is not associated with the initial data packet of the communication session:
    removing the second industrial communication protocol address, the industrial communication protocol preamble, and the message integrity check data from the fourth data packet to generate a sixth data packet; and
    transmitting the sixth data packet to the second BLE radio of the remote device.

20. The non-transitory machine readable storage medium of claim 13, wherein the first data is a first industrial communication protocol address associated with the remote device, and the instructions, when executed, cause the network bridge to:
  obtain a fourth data packet from the field device, the fourth data packet including a second industrial communication protocol address associated with the field device, an industrial communication protocol preamble, and message integrity check data;
  in response to determining that the fourth data packet is associated with a first an initial data packet of a communication session:
    remove the industrial communication protocol preamble and the message integrity check data from the fourth data packet to generate a fifth data packet; and
    transmit the fifth data packet to the second BLE radio of the remote device; and
  in response to determining that the fourth data packet is not associated with the initial data packet of the communication session:
    remove the second industrial communication protocol address, the industrial communication protocol preamble, and the message integrity check data from the fourth data packet to generate a sixth data packet; and
    transmit the sixth data packet to the second BLE radio of the remote device.

* * * * *